(12) United States Patent
Maruyama et al.

(10) Patent No.: US 9,365,112 B2
(45) Date of Patent: Jun. 14, 2016

(54) ACCELERATOR-PEDAL-COUNTERFORCE CONTROL DEVICE AND VEHICLE

(71) Applicant: HONDA MOTOR CO., LTD., Minato-ku, Tokyo (JP)

(72) Inventors: Kohei Maruyama, Utsunomiya (JP); Naoto Sen, Utsunomiya (JP); Takayuki Yoshimura, Dublin, OH (US); Hideto Nebuya, Utsunomiya (JP); Tomoyuki Kinoshita, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/442,790

(22) PCT Filed: Nov. 21, 2012

(86) PCT No.: PCT/JP2012/080154
§ 371 (c)(1),
(2) Date: May 14, 2015

(87) PCT Pub. No.: WO2014/080468
PCT Pub. Date: May 30, 2014

(65) Prior Publication Data
US 2015/0298546 A1 Oct. 22, 2015

(51) Int. Cl.
*B60K 26/02* (2006.01)
*B60K 6/48* (2007.10)
(Continued)

(52) U.S. Cl.
CPC .............. *B60K 26/021* (2013.01); *B60K 6/48* (2013.01); *B60K 6/54* (2013.01); *B60K 26/04* (2013.01);
(Continued)

(58) Field of Classification Search
CPC ............... B60K 2006/4825; B60K 2026/023; B60K 26/021; B60K 26/04; B60K 6/48; B60K 6/52; B60K 6/54; B60W 10/00; B60W 20/00; B60W 20/20; B60W 20/40; B60W 50/16; F02D 41/06; F02N 11/0822; F02N 2200/101; Y02T 10/6221; Y02T 10/6265; Y10S 903/902
USPC ......................................... 701/22, 36, 79, 93
See application file for complete search history.

(56) References Cited

U.S. PATENT DOCUMENTS 7,028,793 B2 *  4/2006  Hu ........................... B60K 6/48
                                                                 180/65.25
7,699,129 B2 *  4/2010  Treharne .............. B60K 26/021
                                                                 180/65.265

(Continued)

FOREIGN PATENT DOCUMENTS

JP     2003-120339 A    4/2003
JP     2005-132225 A    5/2005
(Continued)

*Primary Examiner* — Thomas Tarcza
*Assistant Examiner* — Tyler J Lee
(74) *Attorney, Agent, or Firm* — Carrier Blackman & Associates, P.C.; Joseph P. Carrier; Jeffrey T. Gedeon

(57) ABSTRACT

An accelerator-pedal-counterforce control device for a vehicle, wherein a counterforce control means sets a value obtained by multiplying a prescribed quantity by a constant-speed position as a counterforce-increase position. The counterforce-increase position is a position of the accelerator pedal at which the counterforce on the accelerator pedal is increased from the base counterforce. The constant-speed position is a position of the accelerator pedal at which constant travel at the current vehicle speed is possible. The prescribed quantity is set as a value for achieving forward-rear acceleration according to each vehicle speed.

6 Claims, 13 Drawing Sheets

(51) Int. Cl.
*B60W 20/00* (2016.01)
*B60K 6/54* (2007.10)
*B60K 26/04* (2006.01)
*B60W 10/00* (2006.01)
*B60W 50/16* (2012.01)
*F02D 41/06* (2006.01)
*B60K 6/52* (2007.10)
*F02N 11/08* (2006.01)

(52) U.S. Cl.
CPC ............... *B60W 10/00* (2013.01); *B60W 20/00* (2013.01); *B60W 20/20* (2013.01); *B60W 20/40* (2013.01); *B60K 6/52* (2013.01); *B60K 2006/4825* (2013.01); *B60K 2026/023* (2013.01); *B60W 50/16* (2013.01); *F02D 41/06* (2013.01); *F02N 11/0822* (2013.01); *F02N 2200/101* (2013.01); *Y02T 10/6221* (2013.01); *Y02T 10/6252* (2013.01); *Y02T 10/6265* (2013.01); *Y10S 903/902* (2013.01)

(56) References Cited

U.S. PATENT DOCUMENTS

| | | | | |
|---|---|---|---|---|
| 8,306,717 | B2* | 11/2012 | Suzaki | B60K 26/021 701/36 |
| 8,620,566 | B2* | 12/2013 | Ueno | B60K 6/48 180/65.21 |
| 8,751,126 | B2* | 6/2014 | Sakaguchi | B60K 26/021 701/70 |
| 8,825,327 | B2* | 9/2014 | Kimura | B60W 50/16 180/271 |
| 8,977,462 | B2* | 3/2015 | Sakaguchi | B60K 26/021 701/70 |
| 2007/0050110 | A1* | 3/2007 | Kondoh | B60K 31/18 701/36 |
| 2009/0112382 | A1* | 4/2009 | Treharne | B60K 26/021 701/22 |
| 2010/0274459 | A1* | 10/2010 | Suzaki | B60K 26/021 701/93 |
| 2011/0125367 | A1* | 5/2011 | Sakaguchi | B60K 26/021 701/36 |
| 2012/0059563 | A1* | 3/2012 | Sakaguchi | B60K 26/021 710/70 |
| 2012/0191312 | A1* | 7/2012 | Kimura | B60W 50/16 701/70 |
| 2013/0066508 | A1* | 3/2013 | Ueno | B60K 6/48 701/22 |
| 2013/0118295 | A1* | 5/2013 | Sakaguchi | B60K 26/021 74/513 |
| 2014/0323265 | A1 | 10/2014 | Maruyama et al. | |

FOREIGN PATENT DOCUMENTS

| | | |
|---|---|---|
| JP | 2005-271618 A | 10/2005 |
| JP | 2006-282135 A | 10/2006 |
| WO | 2011-148753 A1 | 12/2011 |
| WO | 2013/077143 A1 | 5/2013 |

* cited by examiner

ACCELERATOR-PEDAL-COUNTERFORCE CONTROL DEVICE AND VEHICLE

TECHNICAL FIELD

The present invention relates to an accelerator-pedal-reaction-force control apparatus (accelerator-pedal-counterforce control device) as well as to a vehicle in which a reaction force control unit is included for controlling a reaction force applied to an accelerator pedal.

BACKGROUND ART

International Publication No. WO 2011/148753 (hereinafter referred to as "WO 2011/148753 A1") discloses an arrangement for controlling a pressing force (reaction force) on an accelerator pedal 32 in a hybrid vehicle.

According to WO 2011/148753 A1, an accelerator opening threshold value is set to a greater one of the values of a first accelerator opening and a second accelerator opening for each of respective vehicle speeds ([0036]). The accelerator opening threshold value is a threshold value for increasing a pressing force on the accelerator pedal 32, so that the pressing force is greater than a base pressing force ([0033]). The first accelerator opening is an accelerator opening defined by subtracting a predetermined accelerator opening quantity α from an accelerator opening on an engine startup line, which serves as a threshold value for switching from an EV travel mode to an HEV travel mode ([0035]). The EV travel mode is a travel mode in which the vehicle travels on only the power of a motor generator 2. The HEV travel mode is a travel mode in which the vehicle travels on the power of an engine 1 in addition to the power of the motor generator 2 ([0014]). The second accelerator opening is an accelerator opening defined by adding an accelerator opening quantity β, which acts to achieve a drive power that accelerates the vehicle at a constant rate, to an accelerator opening that serves to make the vehicle cruise at a constant speed on a flat road for each of the respective vehicle speeds ([0035], [0038]).

Japanese Laid-Open Patent Publication No. 2005-271618 (hereinafter referred to as "JP 2005-271618 A") discloses an accelerator-reaction-force control apparatus for use on a hybrid electric vehicle. According to JP 2005-271618 A, more specifically, the vehicle has a motor-driven domain in which the vehicle is driven by a vehicle driving motor 7, and an engine-driven domain in which the vehicle is driven by an engine 6. When the motor-driven domain switches to the engine-driven domain, the reaction force applied to an accelerator pedal 2 increases when the accelerator pedal 2 is pressed (Abstract). Therefore, switching of the drive source from the motor 7 to the engine 6 is indicated to the driver by means of the reaction force that is applied to the accelerator pedal ([0005]).

Furthermore, JP 2005-271618 A discloses a control process for driving the vehicle with only the engine 6 and charging the battery if the amount of electric energy charged in the battery is not equal to or greater than a predetermined value (in FIG. 4, S1: NO→S9, [0018], claim 2).

SUMMARY OF INVENTION

According to WO 2011/148753 A1, as described above, the accelerator opening quantity β, which is added to a flat-road constant equilibrium opening for cruising at a constant speed, serves to achieve a drive power that accelerates the vehicle at a constant rate ([0035], [0038]).

However, when driving on actual roads, the rate of acceleration required by the vehicle may not necessarily be constant. For example, if the vehicle speed is low, the vehicle requires a higher rate of acceleration in order to reach a vehicle speed to catch up with traffic. Further, if the vehicle speed is high, it is possible for the vehicle to adequately catch up with traffic even at a lower rate of acceleration.

Consequently, as disclosed in WO 2011/148753 A1, if the accelerator opening quantity β for achieving a drive power that accelerates the vehicle at a constant rate is added in order to set a second accelerator opening regardless of the vehicle speed, and the second accelerator opening is used as the accelerator opening threshold value, then when the driver presses on the accelerator pedal in order to achieve a rate of acceleration required to catch up with traffic in a low vehicle speed range, the pressing force (reaction force) increases, which tends to make the driver feel uneasy and uncomfortable concerning the pressing action. The disclosure of JP 2005-271618 A also is silent in this regard.

The present invention has been made in view of the above problems. An object of the present invention is to provide an accelerator-pedal-reaction-force control apparatus and a vehicle, which are capable of enhancing the ease with which an accelerator pedal can be operated.

According to the present invention, an accelerator-pedal-reaction-force control apparatus is provided, having a reaction force control unit configured to control a reaction force applied to an accelerator pedal of a vehicle. In the accelerator-pedal-reaction-force control apparatus, an opening of the accelerator pedal configured to increase the reaction force applied to the accelerator pedal so as to be greater than a base reaction force is defined as a reaction force increasing opening, an opening of the accelerator pedal configured to allow the vehicle to cruise at a vehicle speed at present is defined as a cruise opening, and the reaction force control unit sets a value, which is produced by adding a predetermined quantity to the cruise opening, as the reaction force increasing opening. Further, the predetermined quantity is established as a value for achieving a longitudinal acceleration depending on each of respective vehicle speeds.

According to the present invention, the value produced by adding the predetermined quantity to the cruise opening is set as the reaction force increasing opening. If the driver of the vehicle depresses the accelerator pedal to the reaction force increasing opening, it is possible to achieve a rate of acceleration that depends on the present vehicle speed. Accordingly, it is possible to prevent the driver from feeling uneasy and uncomfortable concerning the action to accelerate the vehicle. In addition, the ease with which the accelerator pedal is operated can be enhanced.

The reaction force control unit may set the reaction force increasing opening such that the higher the vehicle speed is, the smaller the predetermined quantity becomes. With this arrangement, in a low vehicle speed range, it is possible for the driver to achieve a relatively large acceleration by depressing the accelerator pedal to the reaction force increasing opening. As a result, it is possible for the vehicle to achieve a rate of acceleration required to catch up with traffic, for example. Further, in a high vehicle speed range, it is possible for the driver to achieve a relatively small acceleration by maintaining the accelerator pedal at the reaction force increasing opening. As a result, it is possible to prevent the vehicle from being accelerated excessively, thereby preventing degradation in fuel consumption or electric energy consumption.

The reaction force control unit may set the reaction force increasing opening to an opening of the accelerator pedal, which enables an engine that is mounted on the vehicle to produce an output with better kinetic efficiency. In addition, the predetermined quantity may be established as a value for achieving an acceleration depending on each of the respective vehicle speeds, and for enabling an electric generator that is mounted on the vehicle to generate electric power under a drive power from the engine. With this arrangement, by depressing the accelerator pedal to the reaction force increasing opening, the driver is able to accelerate the vehicle while the engine produces an output with better kinetic efficiency. Consequently, it is possible to achieve a vehicle speed that depends on each of the respective vehicle speeds, and to enable the electric generator to generate electric energy while fuel consumption is good. In addition, it is possible to inform the driver concerning the opening of the accelerator pedal, thereby enabling better fuel consumption at each of the respective vehicle speeds.

An opening of the accelerator pedal, at which a first driving mode for driving the vehicle by energizing a motor that is mounted on the vehicle and is used as a drive source of the vehicle switches to a second driving mode for driving the vehicle with at least an engine, may be defined as a first opening threshold value. The value, which is produced by adding the predetermined quantity to the cruise opening, may be defined as a second opening threshold value. If the first driving mode can be selected depending on a state of the vehicle or an action taken by a driver of the vehicle, the reaction force control unit may carry out a reaction force control process using the first opening threshold as the reaction force increasing opening. If the first driving mode cannot be selected, the reaction force control unit may carry out a reaction force control process using the second opening threshold as the reaction force increasing opening.

With the above arrangement, if the first driving mode (in which the vehicle is driven with only a motor) can be selected, a reaction force control process for increasing the reaction force applied to the accelerator pedal is carried out upon switching from driving the vehicle with only the motor to driving the vehicle with at least the engine. Thus, it is possible to inform the driver that the vehicle is being driven with better fuel consumption. Further, if the first driving mode (in which the vehicle is driven with only the motor) cannot be selected, a reaction force control process is carried out, which uses a value produced by adding the predetermined quantity to the cruise opening as the reaction force increasing opening. Consequently, it is possible to prevent the driver from feeling uneasy and uncomfortable concerning the action to accelerate the vehicle. Therefore, both of the reaction force control processes are compatible with each other.

The accelerator-pedal-reaction-force control apparatus may further include a mode switching unit configured to switch between the first driving mode and the second driving mode. The mode switching unit may select the first driving mode and the second driving mode depending on the opening of the accelerator pedal if the vehicle speed is less than a predetermined value, and may select the second driving mode if the vehicle speed is greater than the predetermined value. In addition, if the vehicle speed exceeds the predetermined value, the reaction force control unit may change from the reaction force control process using the first opening threshold to the reaction force control process using the second opening threshold.

With the above arrangement, whether the first driving mode (in which the vehicle is driven with only the motor) can be selected or not is determined depending on the vehicle speed. If the vehicle speed is less than a predetermined value, i.e., if the vehicle is in a low vehicle speed range, the first driving mode (in which the vehicle is driven with only the motor) and the second driving mode (in which the vehicle is driven with at least the engine) are switched from one to the other depending on the opening of the accelerator pedal. If the first driving mode can be selected, then the first opening threshold value is used. On the other hand, if the first driving mode cannot be selected, the second opening threshold value is used. Further, in a state in which the first driving mode can be selected changes to a state in which the first driving mode cannot be selected depending on the vehicle speed, the reaction force control process using the first opening threshold value changes to the reaction force control process using the second opening threshold value. Consequently, it is possible to carry out the reaction force control process depending on the driving mode (the driving state of the vehicle).

A vehicle according to the present invention includes the above accelerator-pedal-reaction-force control apparatus.

DESCRIPTION OF EMBODIMENTS

A. Embodiment

1. Arrangement of Vehicle 10

[1-1. Overall Arrangement]

Figure 1:
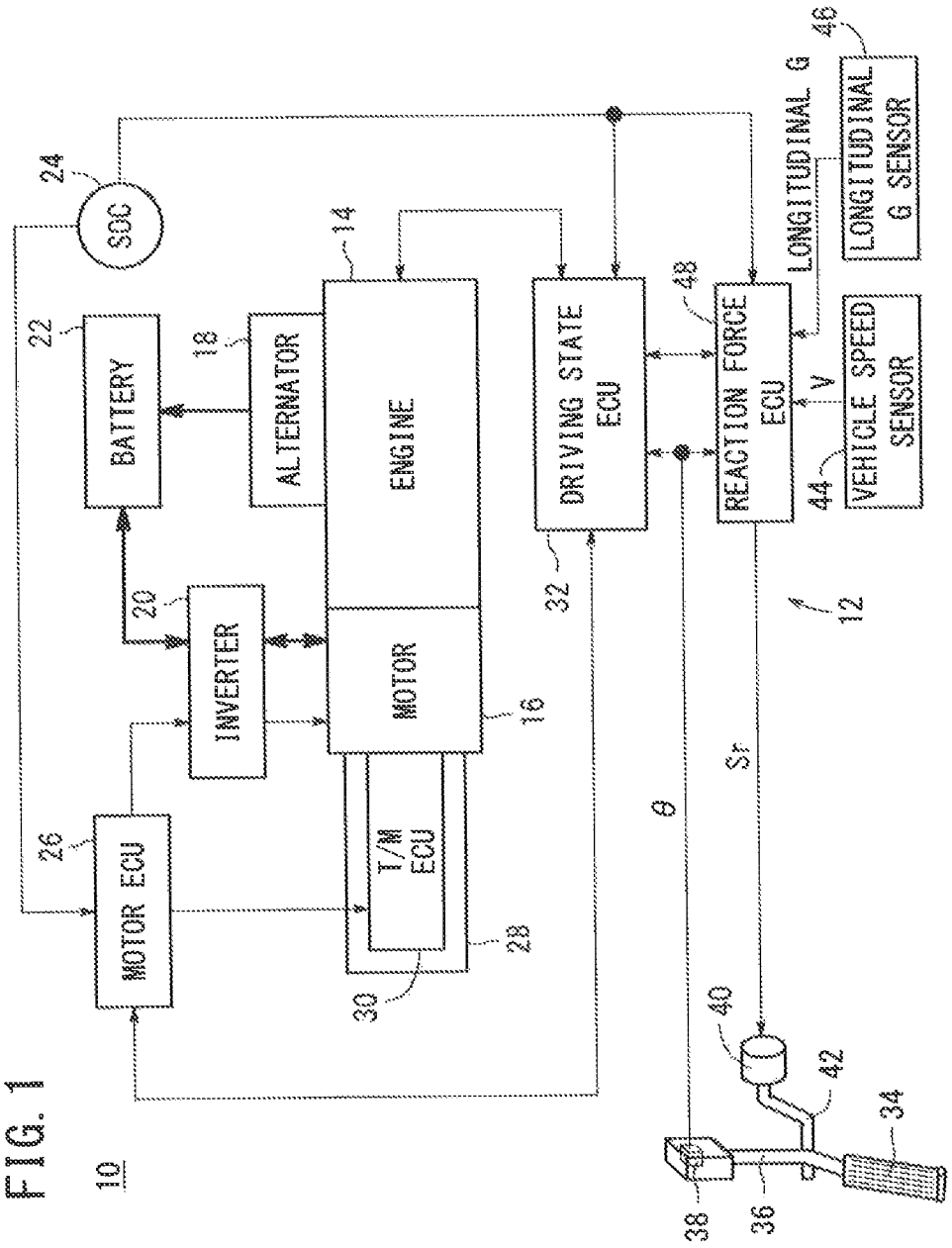
FIG. 1 is a block diagram of a vehicle in which an accelerator-pedal-reaction-force control apparatus is incorporated according to an embodiment of the present invention.

FIG. 1 shows in block form a vehicle 10 in which an accelerator-pedal-reaction-force control apparatus 12 (hereinafter referred to as a "reaction-force control apparatus 12" or a "control apparatus 12") is incorporated according to an embodiment of the present invention. The vehicle 10 comprises a so-called hybrid vehicle, which includes an engine 14 and a traction motor 16 (hereinafter also referred to as a "motor 16") as drive sources.

As shown in FIG. 1, in addition to the engine 14 (internal combustion engine) and the motor 16 (electric motor), the vehicle 10 also includes an alternator 18 (electric generator), an inverter 20, a battery 22 (electric storage device), an SOC sensor 24, a motor electronic control unit 26 (hereinafter referred to as a "motor ECU 26"), a transmission 28, a transmission electronic control unit 30 (hereinafter referred to as a "T/M ECU 30"), a driving state electronic control unit 32 (hereinafter referred to as a "driving state ECU 32"), an accelerator pedal 34, a pedal-side arm 36, an opening sensor 38, a reaction force motor 40, a motor-side arm 42, a vehicle speed sensor 44, a longitudinal acceleration sensor 46 (hereinafter referred to as a "longitudinal G sensor 46"), and a reaction force electric control unit 48 (hereinafter referred to as a "reaction force ECU 48").

According to the present embodiment, as described later, the drive sources are selected, i.e., one or both of the engine 14 and the traction motor 16 are used, depending on the opening of the accelerator pedal 34 (hereinafter referred to as a "pedal opening θ"). According to the present invention, using a reaction force applied from the reaction force motor 40 to the accelerator pedal 34 (hereinafter referred to as a "pedal reaction force Fr"), the reaction force control apparatus 12 guides the driver of the vehicle 10 to operate the accelerator pedal 34 in order to appropriately select the drive sources.

[1-2. Accelerator Pedal 34 and Related Components]

The accelerator pedal 34, which serves to control the output of the drive sources, is fixed to the pedal-side arm 36. The pedal-side arm 36 is swingably coupled to a non-illustrated return spring. If the driver releases the accelerator pedal 34, the accelerator pedal 34 is returned to its original position under a biasing force from the return spring (spring reaction force Fr_sp).

The spring reaction force Fr_sp serves as a basic reaction force (base reaction force), which is generated depending on the pedal opening θ, and is applied to the accelerator pedal 34. However, the spring reaction force Fr_sp is not included within the pedal reaction force Fr. In other words, the base reaction force is related in one-to-one correspondence to the pedal opening θ, and according to the present embodiment, consists of only the spring reaction force Fr_sp. Alternatively, if the feeling that the driver experiences with respect to pressing on the accelerator pedal 34 can be adjusted by an input unit such as a non-illustrated switch, then the base reaction force may include a portion of the driving force that is generated by the reaction force motor 40.

The opening sensor 38 detects an angle (pedal opening θ) through which the accelerator pedal 34 is depressed from the original position, and sends the detected angle to the driving state ECU 32 and the reaction force ECU 48. The pedal opening θ is used for controlling the drive sources (the engine 14 and the traction motor 16), and also is used for controlling the reaction force (pedal reaction force Fr) that is applied to the accelerator pedal 34.

The motor-side arm 42 is swingably disposed in a position for abutment against the pedal-side arm 36. The reaction force motor 40 actuates the motor-side arm 42 in order to apply a pedal reaction force Fr to the pedal-side arm 36 and the accelerator pedal 34. The reaction force ECU 48 includes an input/output unit, a processor, and a memory, none of which are shown. The reaction force ECU 48 controls the driving force of the reaction force motor 40, i.e., the pedal reaction force Fr, using a reaction force generating command Sr, which is based on the pedal opening θ and the vehicle speed V of the vehicle 10, etc. The reaction force motor 40 may be replaced with another driving force generating unit, such as a pneumatic actuator, for example. The reaction force motor 40 and the reaction force ECU 48 function as a reaction force applying unit for applying the pedal reaction force Fr to the accelerator pedal 34.

[1-3. Drive Sources and Related Components]

The engine 14 (internal combustion engine), which serves as a drive source for driving the vehicle 10, generates a driving force Fe [N] or a torque [N·m], supplies the generated driving force or torque to the drive wheels, not shown, of the vehicle 10, and actuates the alternator 18 in order to generate electric power. The electric power [W] generated by the alternator 18 (hereinafter referred to as "generated electric power Pgen") is supplied to the battery 22, a 12-volt system, or to various accessories or auxiliaries, etc., not shown. According to the present embodiment, the engine 14 comprises a 6-cylinder engine.

The traction motor 16 (electric motor), which comprises a three-phase AC brushless motor, generates a driving force Fm [N] or a torque [N·m] for the vehicle 10 based on electric power supplied from the battery 22 through the inverter 20, and supplies the generated driving force or torque to the drive wheels. The traction motor 16 generates electric power by retrieving deceleration energy as regenerative energy (hereinafter referred to as "regenerated electric power Preg" [W]), and supplies the regenerated electric power Preg to the battery 22 in order to charge the battery 22. The regenerated electric power Preg may be supplied to the 12-volt system or to various accessories or auxiliaries, not shown.

The inverter 20, which is of a three-phase bridge design, converts DC power into three-phase AC power, and supplies the three-phase AC power to the traction motor 16. The inverter 20 also converts AC power, which is regenerated when the traction motor 16 operates in a regenerative mode, into DC power, and supplies the DC power to the battery 22.

The SOC sensor 24 (remaining electric power level detecting unit) comprises a non-illustrated current sensor, etc. The SOC sensor 24 detects the remaining electric power level (SOC: State Of Charge) of the battery 22, and sends a signal indicating the detected SOC to the motor ECU 26, the driving state ECU 32, and the reaction force ECU 48.

The motor ECU 26 (electric motor control unit) controls the inverter 20 based on commands from the driving state ECU 32 and output signals from various sensors, including a voltage sensor, a current sensor, etc., not shown, thereby controlling the output (propulsive power) of the traction motor 16. The motor ECU 26 also controls operation of the transmission 28 through the T/M ECU 30.

The driving state ECU 32 serves as an engine electronic control unit (hereinafter referred to as an "engine ECU") for controlling the engine 14, and also controls a drive source assembly including the engine 14 and the traction motor 16 based on the pedal opening θ, the vehicle speed V, etc.

2. Controls According to the Present Embodiment

[2-1. Switching Between Drive Sources]

(2-1-1. General)

According to the present embodiment, the drive sources are selected, i.e., the driving states of the vehicle 10 are selected, in order to drive the vehicle 10 selectively in a mode (hereinafter referred to as a "MOT mode") in which only the traction motor 16 is operated depending on the vehicle speed V and a requested driving force Freq [N] (or a requested torque [N·m]) for the traction motor 16, a mode (hereinafter referred to as an "ENG mode") in which only the engine 14 is operated, and a mode (hereinafter referred to as an "ENG+MOT mode") in which both the traction motor 16 and the engine 14 are operated. The above modes are selected or switched depending on the vehicle speed V, the remaining electric power level (SOC) of the battery 22, and the pedal opening θ. Essentially, the pedal opening θ can be treated as an indication of the requested driving force Freq for the traction motor 16.

(2-1-2. Switching Characteristics for Drive Sources when Remaining Electric Power Level of Battery 22 is High)

Figure 2:
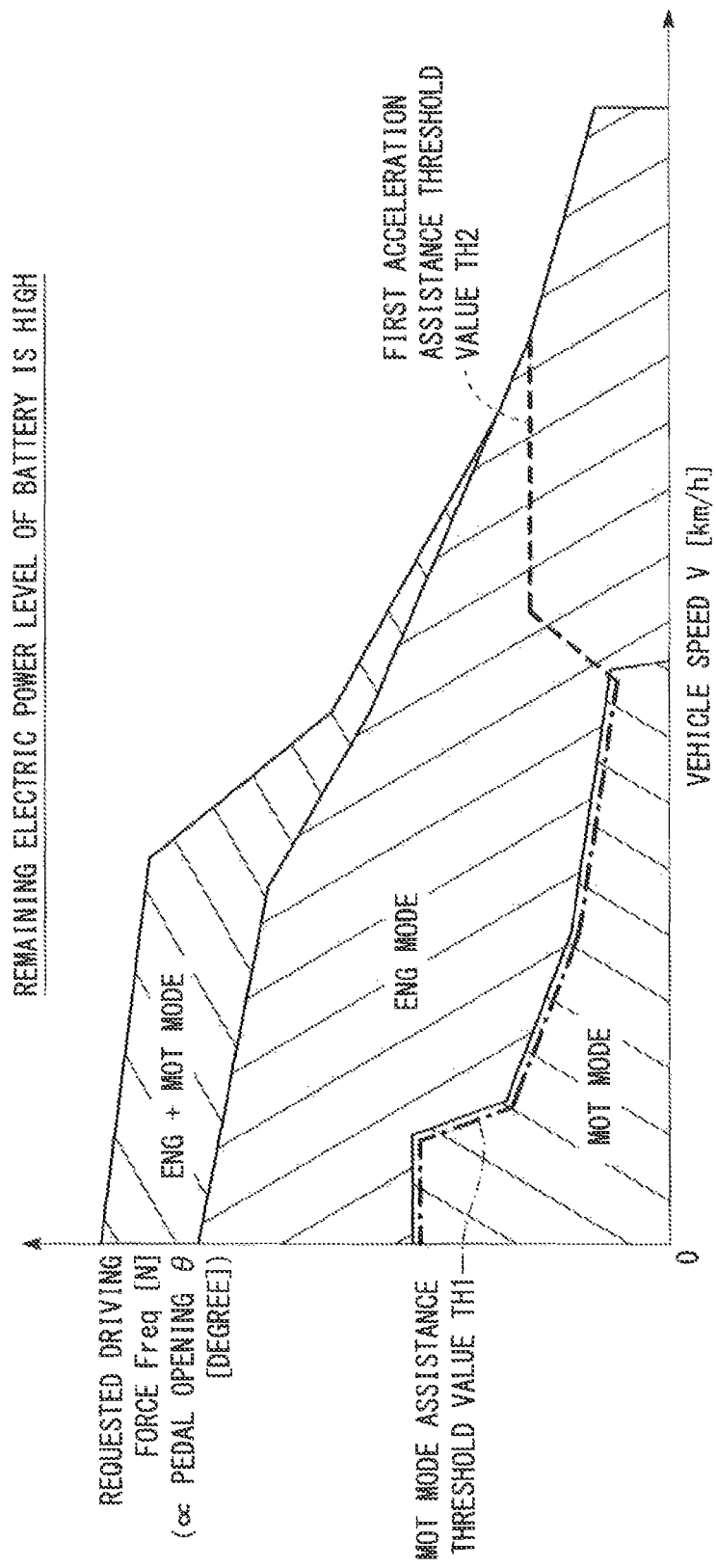
FIG. 2 is a diagram showing selective characteristics for drive sources at a time that a remaining electric power level of a battery is high, i.e., a map for a high remaining electric power level.

FIG. 2 shows selective characteristics for the drive sources at a time that the remaining electric power level of the battery 22 is high, i.e., a map for a high remaining electric power level. If the remaining electric power level of the battery 22 is high, the battery 22 maintains the electric power level so as to be high enough to drive the vehicle 10 using only the traction motor 16, for example. Specific values of the remaining electric power level may be established appropriately depending on the specifications of the traction motor 16, etc.

As shown in FIG. 2, if the vehicle speed V is relatively low and the pedal opening θ is relatively small, i.e., if the requested driving force Freq is small, the MOT mode is selected. If the pedal opening θ is greater than in the MOT mode, i.e., if the requested driving force Freq is greater than in the MOT mode, or if the vehicle speed V is greater than in the MOT mode, the ENG mode is selected. If the pedal opening θ is greater than in the ENG mode, i.e., if the requested driving force Freq is greater than in the ENG mode, or if the vehicle speed V is greater than in the ENG mode, the ENG+MOT mode is selected.

(2-1-3. Switching Characteristics for Drive Sources when Remaining Electric Power Level of Battery 22 is Low)

Figure 3:
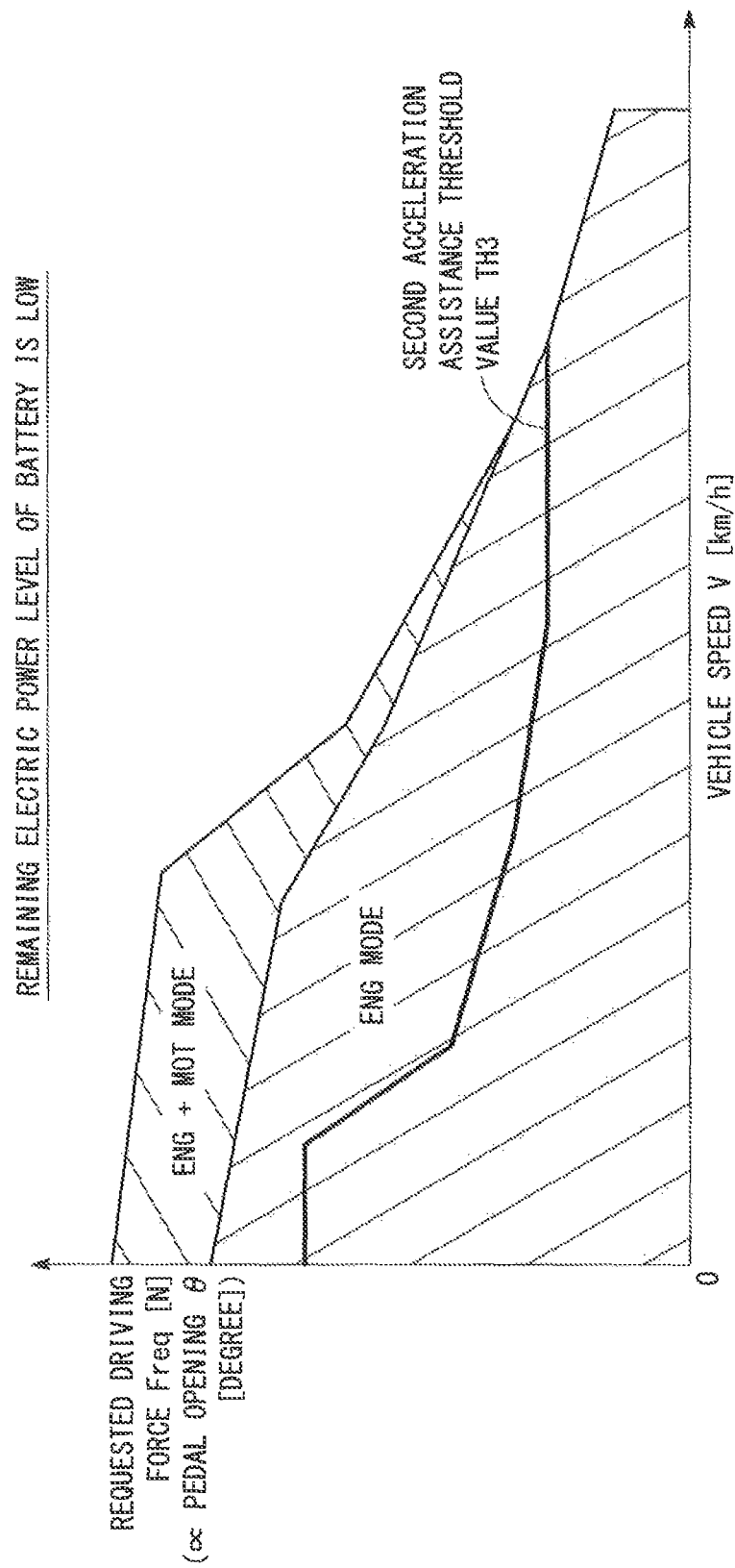
FIG. 3 is a diagram showing selective characteristics for the drive sources at a time that a remaining electric power level of the battery is low, i.e., a map for a low remaining electric power level.

FIG. 3 shows selective characteristics for the drive sources at a time that the remaining electric power level of the battery 22 is low, i.e., a map for a low remaining electric power level. The low remaining electric power level of the battery 22 implies that the battery 22 cannot maintain a level of electric power that is high enough to drive the vehicle 10 with only the traction motor 16, for example. Specific values of the remaining electric power level may be established appropriately depending on the specifications of the traction motor 16, etc.

Compared with the selective characteristics shown in FIG. 2, the selective characteristics shown in FIG. 3 are free of a domain for the MOT mode, because the selective characteristics shown in FIG. 3 are used when the remaining electric power level of the battery 22 is low, and hence the vehicle 10 is prevented from being driven by only the traction motor 16, which requires the supply of a large amount of electric power from the battery 22. However, the engine 14 is operated even though the vehicle speed V is low and the requested driving force Freq is small. Consequently, electric power consumption by the battery 22 is minimized, and the battery 22 is charged by the alternator 18, which is actuated due to the fact that the engine 14 is operated.

[2-2. Control of Pedal Reaction Force Fr]

According to the present embodiment, in order to appropriately select the drive sources (the engine 14 and the traction motor 16), the control apparatus 12 guides the driver of the vehicle 10 to operate the accelerator pedal 34 using the pedal reaction force Fr.

(2-2-1. When Remaining Electric Power Level of Battery 22 is High)

(2-2-1-1. MOT Mode Assistance)

Generally, when the vehicle speed V is low and the requested driving force Freq is small, the vehicle 10 has lower energy efficiency (fuel consumption efficiency) if the vehicle 10 is driven by the engine 14, and the vehicle 10 has higher energy efficiency if the vehicle is driven by the traction motor 16. According to the present embodiment, if the vehicle speed V is low and the requested driving force Freq is small while the remaining electric power level of the battery 22 is high, the MOT mode is selected (FIG. 2). In this case, the pedal reaction force Fr is increased at a pedal opening θ at which switching occurs between the MOT mode and the ENG mode, so as to inform the driver concerning the pedal opening θ at which switching occurs between the MOT mode and the ENG mode, and thereby prompting the driver to select the MOT mode.

More specifically, as shown in FIG. 2, if the pedal opening θ exists on the line indicated by "TH1" (hereinafter referred to as a "MOT mode assistance threshold value TH1", a "first reaction force increasing threshold value TH1", or a "threshold value TH1") in relation to the vehicle speed V, the reaction force ECU 48 increases the pedal reaction force Fr.

(2-2-1-2. Acceleration Assistance)

As described above, when the vehicle speed V increases, the vehicle 10 terminates the MOT mode and switches to the ENG mode. According to the present embodiment, after the vehicle 10 has been switched from the MOT mode to the ENG mode, if the pedal opening θ exists on a line indicated by "TH2" (hereinafter referred to as a "first acceleration assistance threshold value TH2", a "second reaction force increasing threshold value TH2", or a "threshold value TH2"), the reaction force ECU 48 increases the pedal reaction force Fr.

The threshold value TH2 is set to a value that is produced by adding a predetermined quantity Q1 to a pedal opening at which the vehicle 10 can cruise at a constant vehicle speed V (hereinafter referred to as a "cruise opening θcru") at the present time. The predetermined quantity Q1 is set to a value for achieving a certain rate of acceleration of the vehicle 10 depending on the vehicle speed V at the present time.

Further, according to the present embodiment, the predetermined quantity Q1 is set not only to achieve a certain rate of acceleration of the vehicle 10 depending on the vehicle speed V at the present time, but also is set in view of energy efficiency of the engine 14. Details concerning the predetermined quantity Q1 will be described later. The first and second reaction force increasing threshold values TH1, TH2 will hereinafter be referred to collectively as a "threshold value for a high remaining electric power level".

(2-2-1-3. Specific Examples)

Figure 4:
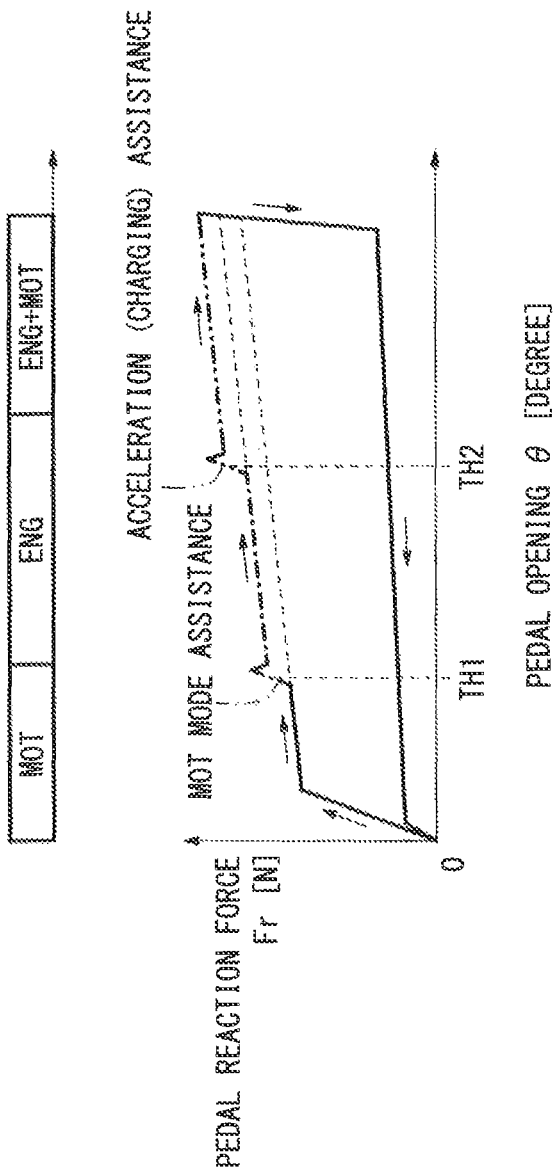
FIG. 4 is a diagram showing a first example of a relationship between an opening of an accelerator pedal (pedal opening) and a reaction force applied to the accelerator pedal (pedal reaction force), if the pedal opening is increased and then reduced at a time that the remaining electric power level of the battery is high.

FIG. 4 shows a first example of a relationship between the pedal opening θ and the pedal reaction force Fr, if the pedal opening θ is increased and then reduced at a time that the remaining electric power level of the battery 22 is high.

As shown in FIG. 4, when the pedal opening θ increases from zero, initially the MOT mode is selected. As the pedal opening θ becomes higher, the MOT mode changes to the ENG mode. Just prior to changing from the MOT mode to the ENG mode at the MOT mode assistance threshold value TH1, the pedal reaction force Fr increases sharply, thus allowing the driver to recognize that switching is about to take place from the MOT mode to the ENG mode.

A further increase in the pedal opening θ increases the vehicle speed V, thereby setting the first acceleration assistance threshold value TH2 instead of the MOT mode assistance threshold value TH1. When the pedal opening θ reaches the threshold value TH2, the pedal reaction force Fr increases sharply. Consequently, the driver is able to recognize that the vehicle 10 can be accelerated appropriately from the vehicle speed V at the present time, and also can recognize the pedal opening θ for achieving good fuel economy.

Figure 5:
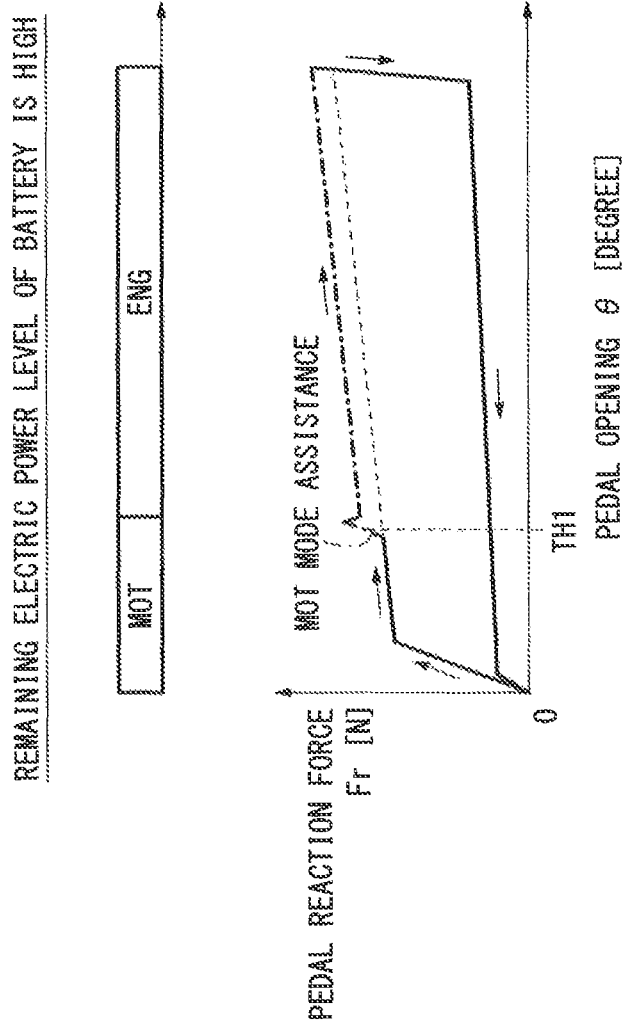
FIG. 5 is a diagram showing a second example of a relationship between the pedal opening and the pedal reaction force, if the pedal opening is increased and then reduced at a time that the remaining electric power level of the battery is high.

FIG. 5 shows a second example of a relationship between the pedal opening θ and the pedal reaction force Fr, if the pedal opening θ is increased and then reduced at a time that the remaining electric power level of the battery 22 is high.

As shown in FIG. 5, when the pedal opening θ increases from zero, initially the MOT mode is selected. As the pedal opening θ becomes higher, the MOT mode changes to the ENG mode. Just prior to changing from the MOT mode to the ENG mode at the MOT mode assistance threshold value TH1, the pedal reaction force Fr increases sharply, thus allowing the driver to recognize that switching is about to take place from the MOT mode to the ENG mode. In FIG. 5, the ENG mode does not switch to the ENG+MOT mode.

(2-2-2. When Remaining Electric Power Level of Battery 22 is Low)

(2-2-2-1. Acceleration Assistance)

As described above, if the remaining electric power level of the battery 22 is low, the vehicle 10 is driven in the ENG mode, not the MOT mode, even though the vehicle 10 is in a low vehicle speed range. According to the present embodiment, provided that the remaining electric power level of the battery 22 is low, if the pedal opening θ exists on a line indicated by "TH3" (hereinafter referred to as a "second acceleration assistance threshold value TH3", a "third reaction force increasing threshold value TH3", or a "threshold value TH3"), the reaction force ECU 48 increases the pedal reaction force Fr.

As with the threshold value TH2, the threshold value TH3 is set to a value that is produced by adding a predetermined quantity Q2 to the pedal opening at which the vehicle 10 can cruise at the constant vehicle speed V (hereinafter referred to as a "cruise opening θcru") at the present time. As with the predetermined quantity Q1, the predetermined quantity Q2 is set to a value for achieving a certain rate of acceleration of the vehicle 10 depending on the vehicle speed V at the present time. According to the present embodiment, the predetermined quantity Q2 is set not only to achieve a certain rate of acceleration of the vehicle 10 depending on the vehicle speed V at the present time, but also is set in view of energy efficiency of the engine 14. Further, according to the present embodiment, the predetermined quantities Q1, Q2 are identical values, although the predetermined quantities Q1, Q2 may be different values. Details concerning the predetermined quantities Q1, Q2 will be described later. The third reaction force increasing threshold value TH3 will hereinafter also be referred to as a "threshold value for a high remaining electric power level".

(2-2-2-2. Specific Examples)

Figure 6:
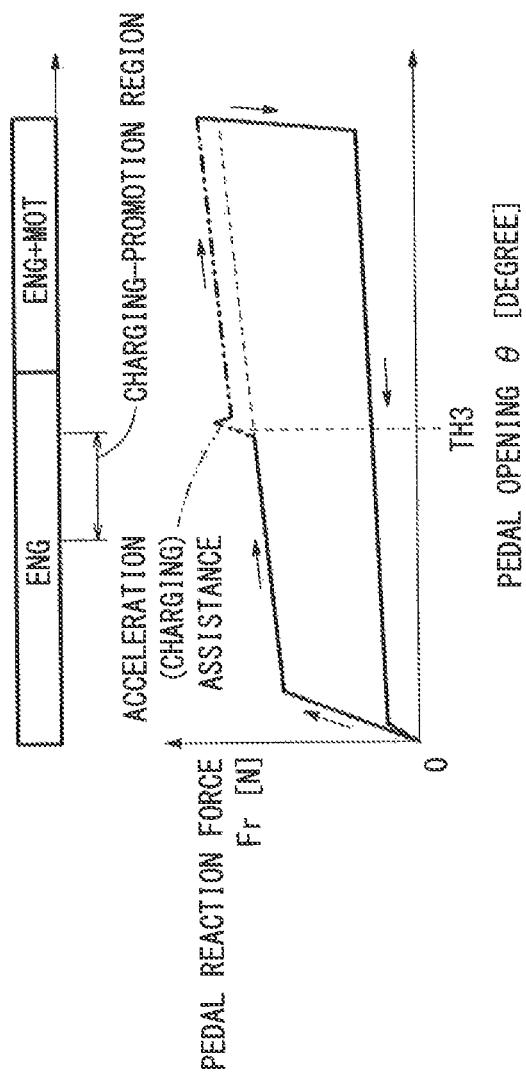
FIG. 6 is a diagram showing an example of a relationship between the pedal opening and the pedal reaction force, if the pedal opening is increased and then reduced at a time that the remaining electric power level of the battery is low.

FIG. 6 is a diagram showing an example of the relationship between the pedal opening θ and the pedal reaction force Fr, if the pedal opening θ is increased and then reduced at a time that the remaining electric power level of the battery 22 is low.

As shown in FIG. 6, when the pedal opening θ increases from zero, the ENG mode is selected without involvement of the MOT mode. As the pedal opening θ becomes higher and reaches the second acceleration assistance threshold value TH3, the pedal reaction force Fr increases sharply. Consequently, the driver is able to recognize that the vehicle 10 can appropriately be accelerated from the vehicle speed V at the present time, and also can recognize the pedal opening θ for achieving good fuel economy. A further increase in the pedal opening θ results in switching from the ENG mode to the ENG+MOT mode.

(2-2-3. Setting of Pedal Reaction Force Fr)

Figure 7:
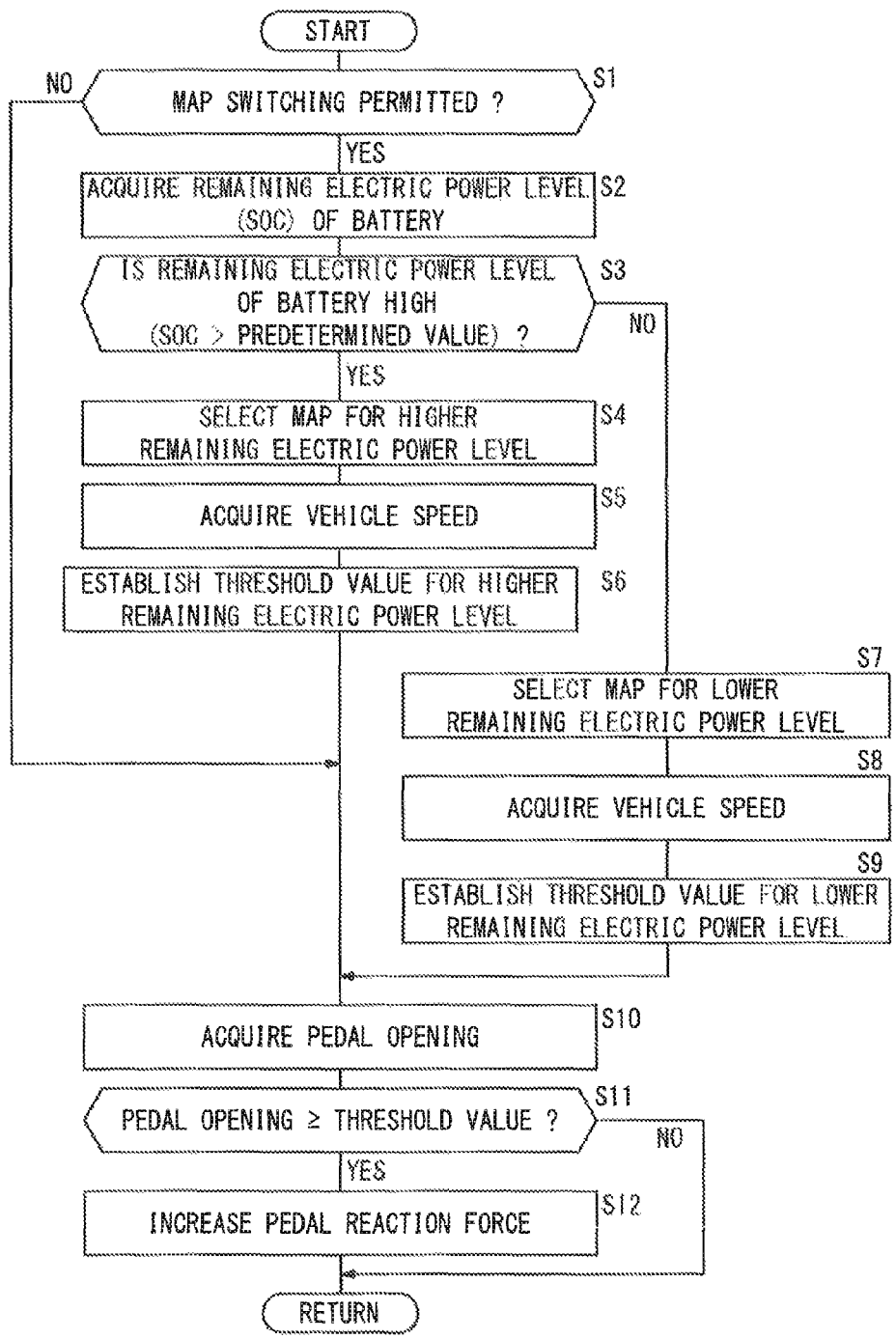
FIG. 7 is a flowchart of a sequence, which is followed by a reaction force electronic control unit in order to set a pedal reaction force.

FIG. 7 is a flowchart of a sequence followed by the reaction force ECU 48 in order to set the pedal reaction force Fr. In step S1, the reaction force ECU 48 assesses whether or not to permit switching between a map for a high remaining electric power level (FIG. 2) and a map for a low remaining electric power level (FIG. 3). If the reaction force ECU 48 permits switching between the maps at all times, there is a possibility that the driver may feel uneasy and uncomfortable. Thus, according to the present embodiment, the reaction force ECU 48 permits switching between the maps only if predetermined conditions are satisfied. More specifically, the reaction force ECU 48 permits switching between the maps if the pedal opening θ is zero, i.e., if the accelerator pedal 34 is in its original position, if the reaction force motor 40 is not generating a pedal reaction force Fr, and if the reaction force ECU 48 is not supplying a reaction force generating command Sr to the reaction force motor 40. Such conditions for permitting switching between the maps may be used in any suitable combination, or other permitting conditions may also be established.

If the reaction force ECU 48 permits switching between the maps (step S1: YES), the control proceeds to step S2. If the reaction force ECU 48 does not permit switching between the maps (step S1: NO), the control proceeds to step S10.

In step S2, the reaction force ECU 48 acquires the remaining electric power level (SOC) of the battery 22 from the SOC sensor 24. In step S3, the reaction force ECU 48 assesses whether or not the remaining electric power level of the battery 22 is high. More specifically, the reaction force ECU 48 assesses whether or not the SOC acquired in step S2 is greater than a predetermined value (SOC threshold value THsoc).

If the remaining electric power level of the battery 22 is high (step S3: YES), then in step S4, the reaction force ECU 48 selects the map for the high remaining electric power level (FIG. 2). In step S5, the reaction force ECU 48 acquires the vehicle speed V from the vehicle speed sensor 44.

In step S6, the reaction force ECU 48 establishes a threshold value for the high remaining electric power level (the first reaction force increasing threshold value TH1 or the second reaction force increasing threshold value TH2) in relation to the vehicle speed V contained in the map for the high remaining electric power level. As shown in FIG. 2, depending on the vehicle speed V, either one of the first and second reaction force increasing threshold values TH1, TH2 may not be established. Further, the threshold value TH3 (FIG. 3) may be used instead of the threshold value TH2 (FIG. 2). In addition, both of the threshold values TH1 and TH3 may be established at the same time.

Referring back to step S3, if the remaining electric power level of the battery 22 is not high (step S3: NO), then in step S7, the reaction force ECU 48 selects the map for the low remaining electric power level (FIG. 3). In step S8, the reaction force ECU 48 acquires the vehicle speed V from the vehicle speed sensor 44.

In step S9, the reaction force ECU 48 establishes a threshold value for the low remaining electric power level (the third reaction force increasing threshold value TH3) in relation to the vehicle speed V in the map for the low remaining electric power level.

In step S10, the reaction force ECU 48 acquires the pedal opening θ from the opening sensor 38. In step S11, the reaction force ECU 48 assesses whether or not the pedal opening θ acquired in step S10 is equal to or greater than the threshold value for the high remaining electric power level established in step S6, or the threshold value for the low remaining electric power level established in step S9. If the pedal opening θ is equal to or greater than the threshold value established in step S6 or step S9, i.e., the threshold value for the high remaining electric power level or the threshold value for the low remaining electric power level (step S11: YES), then in step S12, the reaction force ECU 48 increases the pedal reaction force Fr. If the pedal opening θ is not equal to or greater than the threshold value established in step S6 or step S9, i.e., the threshold value for the high remaining electric power level or the threshold value for the low remaining electric power level (step S11: NO), then the reaction force ECU 48 does not increase the pedal reaction force Fr, terminates the present processing cycle, and proceeds to the next processing cycle, i.e., returns to step S1.

For example, if the map for the high remaining electric power level (FIG. 2) is selected, and the first reaction force increasing threshold value TH1 or the second reaction force increasing threshold value TH2 is established depending on the vehicle speed V, then the reaction force ECU 48 compares the pedal opening θ with the threshold value TH1 or TH2. If the pedal opening θ is equal to or greater than the threshold value TH1 or TH2, the reaction force ECU 48 increments the pedal reaction force Fr by one step (see FIGS. 4 and 5). If the pedal opening θ is equal to or greater than the threshold value TH1 and the reaction force ECU 48 increments the pedal reaction force Fr by one step, after which the pedal opening θ becomes equal to or greater than the threshold value TH2 in accordance with the increase of the vehicle speed V, then the reaction force ECU 48 increments the pedal reaction force Fr by two steps (see FIG. 4). Furthermore, if the pedal opening θ is smaller than the first and second reaction force increasing threshold values TH1, TH2, the reaction force ECU 48 uses the ordinary pedal reaction force Fr (see FIGS. 4 and 5).

If the map for the low remaining electric power level (FIG. 3) is selected, and only the third reaction force increasing threshold value TH3 is established depending on the vehicle speed V, the reaction force ECU 48 compares the pedal opening θ with the threshold value TH3. If the pedal opening θ is equal to or greater than the threshold value TH3, the reaction force ECU 48 increments the pedal reaction force Fr by one step (see FIG. 6). If the pedal opening θ is not equal to or greater than the threshold value TH3, the reaction force ECU 48 uses the ordinary pedal reaction force Fr (see FIG. 6).

(2-2-4. First and Second Acceleration Assistance Threshold Values TH2, TH3)

(2-2-4-1. Outline of First and Second Acceleration Assistance Threshold Values TH2, TH3)

As described above, the threshold values TH2, TH3 are set to values that are produced by adding the predetermined quantities Q1, Q2 to the pedal opening (hereinafter referred to as a "cruise opening θcru") at which the vehicle 10 can cruise at a constant vehicle speed V at the present time.

Figure 8:
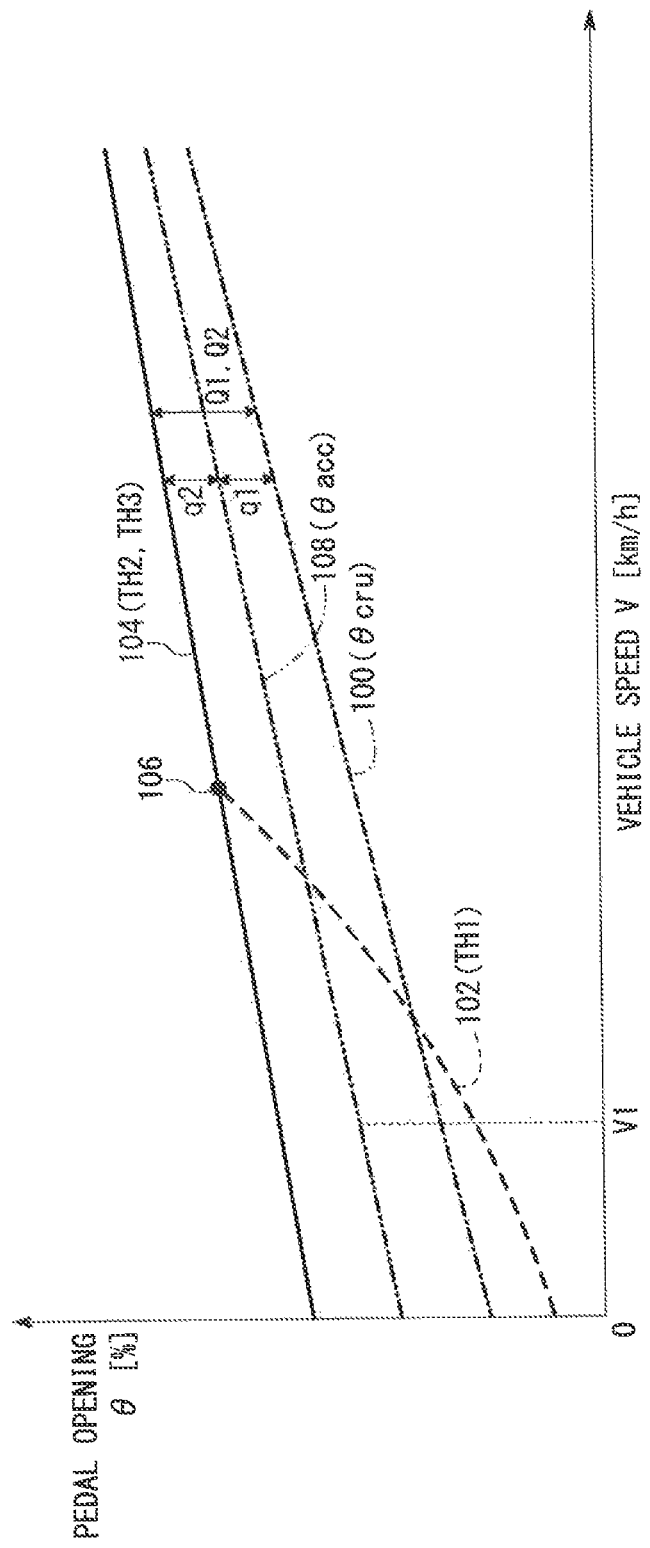
FIG. 8 is a diagram showing a map representing a relationship between vehicle speed, a cruise opening, and first through third reaction force increasing threshold values.

FIG. 8 is a diagram showing a map, which represents a relationship between the vehicle speed V, the cruise opening θcru, and the first through third reaction force increasing threshold values TH1 through TH3. In FIG. 8, a dot-and-dashed-line curve 100 represents the cruise opening θcru, a broken-line curve 102 represents the threshold value TH1, and a solid-line curve 104 represents the threshold values TH2, TH3. Within a domain in which the vehicle speed V is less than a switching point 106 on the solid-line curve 104, the broken-line curve 102, which represents the threshold value TH1, is used, and the threshold value TH2 is not used within the domain in which the vehicle speed V is less than a switching point 106. A two-dot-and-dashed-line curve 108 represents an acceleration assistance opening θacc, which will be described later.

As shown in FIG. 8, each of the predetermined quantities Q1, Q2 is divided into a first additive value q1 for acceleration assistance and a second additive value q2 for excessive output.

More specifically, the first additive value q1 is an additive value for the pedal opening θ, which is added to an output that enables the vehicle 10 (engine 14) to cruise at a constant vehicle speed V at the present time, and which is required to produce a driving force to achieve a longitudinal G (hereinafter referred to as a "requested longitudinal G") depending on the vehicle speed V at the present time. The requested longitudinal G refers to a longitudinal G, which corresponds to an acceleration that is expected to be required depending on the vehicle speed V.

The driving force F, which is generated by the engine 14 depending on the first additive value q1, is used for the purpose of driving the vehicle 10 itself. Further details of the requested longitudinal G and the first additive value q1 (predetermined quantities Q1, Q2 in view of the first additive value q1) will be described later.

The second additive value q2 is an additive value for the pedal opening θ, which is added in view of energy efficiency of the engine 14. More specifically, when the accelerator pedal 34 is depressed to make the pedal opening θ equal to the sum of the cruise opening θcru and the first additive value q1 (θcru+q1), the output of the engine 14 may not be efficient in terms of energy efficiency (fuel consumption efficiency). Thus, according to the present embodiment, rather than generating the pedal reaction force Fr in order to make the pedal opening θ equal to the sum of the cruise opening θcru and the first additive value q1, the pedal reaction force Fr is increased sharply at the time that the accelerator pedal 34 is depressed further to a pedal opening θ corresponding to an output of the engine 14, thereby achieving better energy efficiency. The driving force F, which is generated by the engine 14 depending on the second additive value q2, is used for purposes apart from driving the vehicle 10, e.g., for charging the battery 22 and energizing various accessories or auxiliaries, not shown. Further details of the second additive value q2 (predetermined quantities Q1, Q2 in view of the second additive value q2) will be described later.

(2-2-4-2. Setting of First and Second Acceleration Assistance Threshold Values TH2, TH3)

Figure 9:
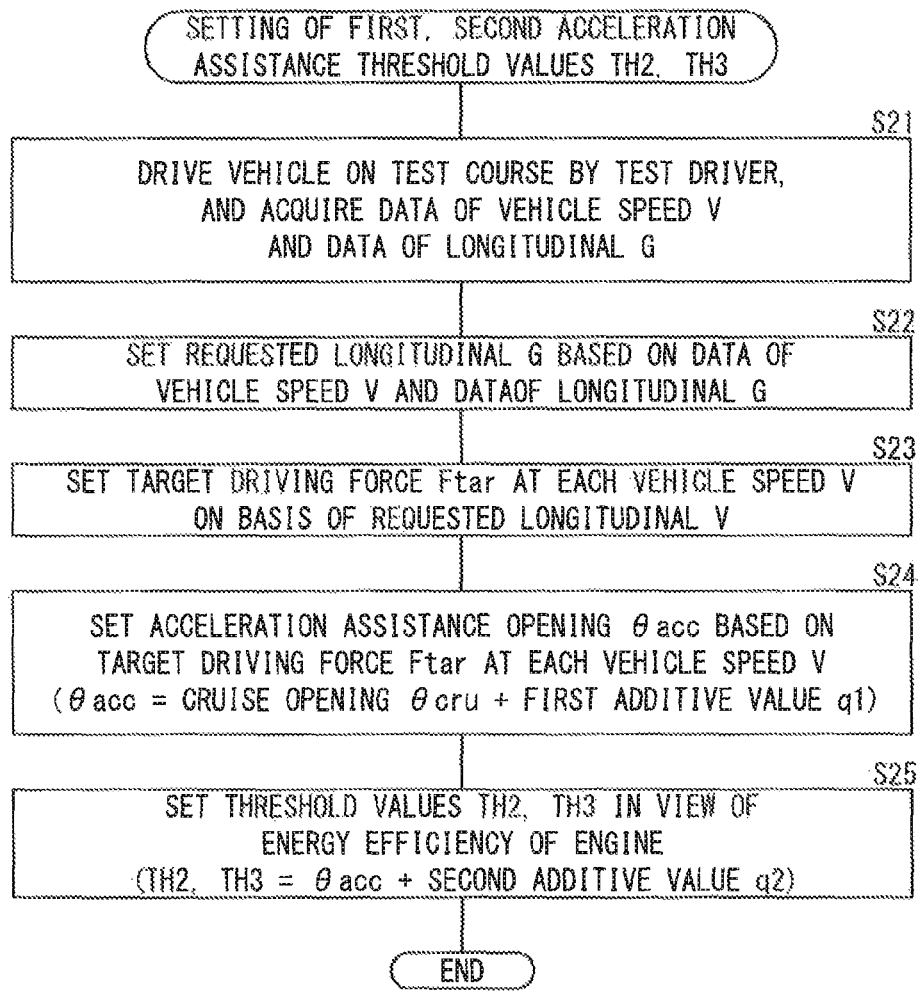
FIG. 9 is a flowchart of a sequence for setting first and second acceleration assistance threshold values (second and third reaction force increasing threshold values)

FIG. 9 is a flowchart of a sequence for setting the first and second acceleration assistance threshold values TH2, TH3. Among the steps shown in FIG. 9, steps S21 through S24 are related to the first additive value q1, whereas step S25 is related to the second additive value q2.

(2-2-4-2-1. Acquisition of Measured Data)

In step S21 of FIG. 9, the vehicle 10 is driven on a test course by a test driver, and data of the vehicle speed V and the longitudinal acceleration (hereinafter referred to as a "longitudinal G") are measured on the vehicle 10, and the measured data are acquired from the vehicle 10. Data of the vehicle speed V are acquired by the vehicle speed sensor 44, and data of the longitudinal G are acquired by the longitudinal G sensor 46. Alternatively, data of the longitudinal G may be calculated as time differential values of the data of the vehicle speed V.

The data of the vehicle speed V and the data of the longitudinal G are stored by a data logger. Alternatively, an electronic control unit such as the reaction force ECU 48 or the like may include a data logger function, which operates to store the data of the vehicle speed V and the data of the longitudinal G.

(2-2-4-2-2. Setting of Requested Longitudinal G)

In step S22, the developer of the vehicle 10 sets a requested longitudinal G for each respective vehicle speed V. The requested longitudinal G is used to determine the acceleration of the vehicle 10, which may potentially be required by the driver at each respective vehicle speed V. In other words, the acceleration of the vehicle 10, which may potentially be required by the driver, is considered to have a significant correlation with the longitudinal G. Therefore, by determining the requested longitudinal G, it is possible to estimate the acceleration of the vehicle 10 that may potentially be required by the driver.

For example, a longitudinal G, which includes a prescribed proportion (e.g., 90%) of the longitudinal G that is generated for each of the respective vehicle speeds V, is regarded as a requested longitudinal G. On the basis of the longitudinal G, which is determined in this manner, it is possible to estimate the acceleration of the vehicle 10 that may potentially be required by the driver for each of the respective vehicle speeds V.

If the vehicle speed V is equal to or less than a predetermined value (V1 in FIG. 8), the requested longitudinal G is regarded as a constant value, regardless of the data concerning the requested longitudinal G. In this manner, the requested longitudinal G takes into consideration the fact that there is a relatively high possibility that the vehicle 10 will speed up suddenly when the vehicle 10 is in a low vehicle speed range. In other words, the requested longitudinal G serves to prevent the driver from feeling uneasy and uncomfortable at times that the vehicle 10 speeds up suddenly when the vehicle 10 is in a low vehicle speed range.

Rather than being performed by the developer of the vehicle 10, the process of step S22 may be carried out by an electronic control unit such as the reaction force ECU 48 or the like.

(2-2-4-2-3. Setting of Target Driving Force Ftar)

In step S23 of FIG. 9, on the basis of the requested longitudinal G, the developer of the vehicle 10 sets a target driving force Ftar for each of the respective vehicle speeds V. The target driving force Ftar is a driving force at which the requested longitudinal G is achieved. Further, as shown in FIG. 10, the target driving force Ftar can be calculated on the basis of measured values, simulated values, etc., for each of the engine 14 and the motor 16.

Figure 10:
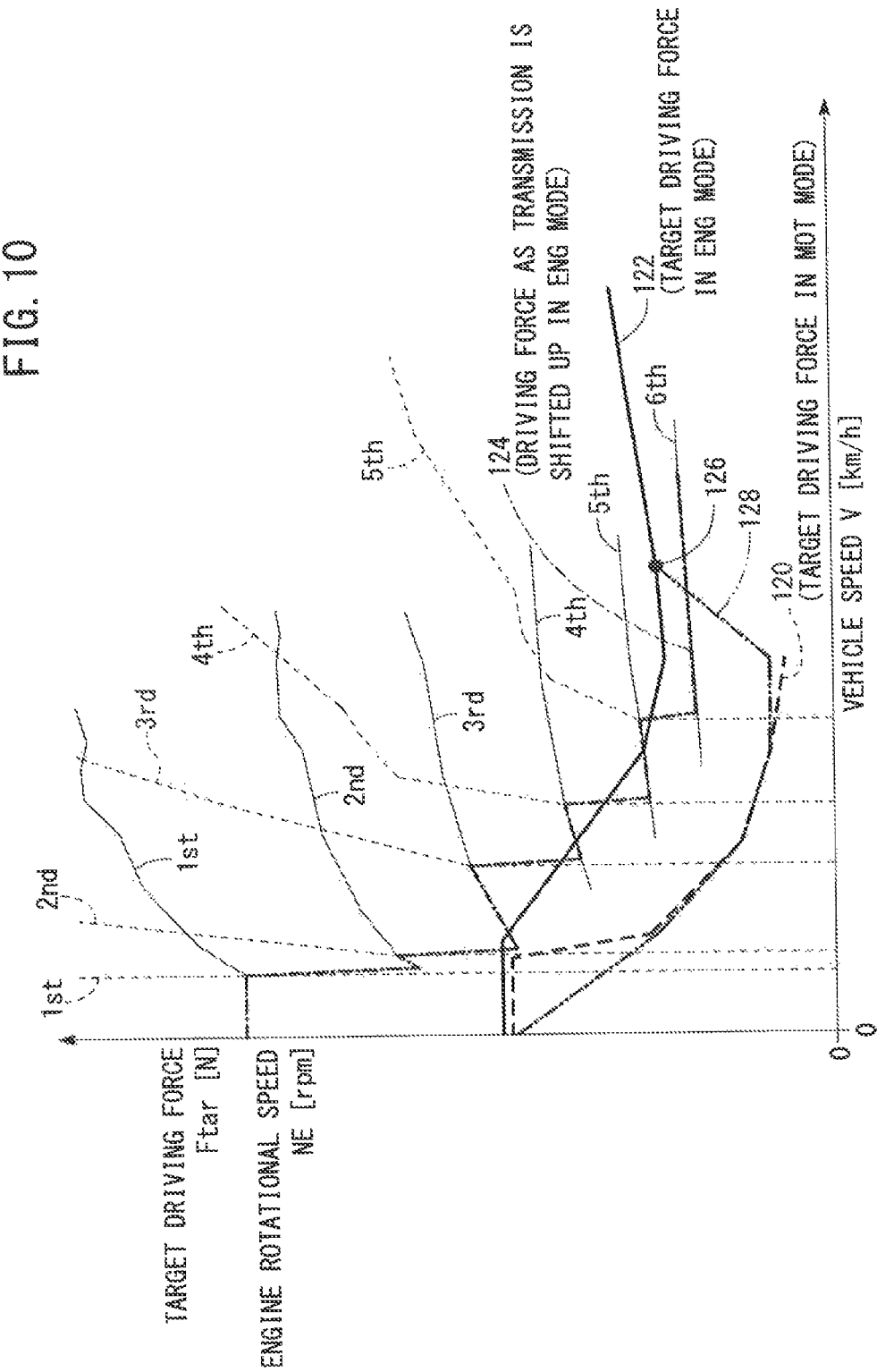
FIG. 10 is a diagram illustrating a process of determining a target driving force for each of respective vehicle speeds.

FIG. 10 is a diagram illustrating a process of determining a target driving force Ftar for each of the respective vehicle speeds V on the basis of the data acquired in step S21. In FIG. 10, a thick-broken-line curve 120 indicates a target driving force Ftar in relation to the MOT mode, a thick-solid-line curve 122 indicates a target driving force Ftar in relation to the ENG mode, and a thick-dot-and-dash-line curve 124 indicates a target driving force Ftar (or a driving force Fe) which is applicable at the time that the transmission 28 is shifted up in the ENG mode. The thin-solid-line curves, which are marked 1st, 2nd, 3rd, 4th, 5th, and 6th, represent driving forces for the respective gear positions of the transmission 28. The thin-broken-line curves, which are marked 1st, 2nd, 3rd, 4th, and 5th, represent engine rotational speeds NE [rpm] for the respective gear positions of the transmission 28.

As described above, if the remaining electric power level of the battery 22 is high, the vehicle 10 is driven in the MOT mode and thereafter in the ENG mode. Therefore, if the vehicle speed V is relatively low, rather than the thick-solid-line curve 122, the thick-broken-line curve 120 is used.

Further, if the remaining electric power level of the battery 22 is high, the MOT mode assistance threshold value TH1 and the first acceleration assistance threshold value TH2 are used. Among the threshold values TH1 and TH2, the threshold value TH2 is a value that corresponds to the target driving force Ftar, whereas the threshold value TH1 is a value that serves to indicate switching between the MOT mode and the ENG mode. Therefore, if the remaining electric power level of the battery 22 is high, the thick-broken-line curve 120 is used within a domain in which the vehicle speed V is less than a switching point 126, and the thick-solid-line curve 122 is used within a domain in which the vehicle speed V is greater than the switching point 126. A thick-two-dot-and-dash-line curve 128 is used for switching between the thick-broken-line curve 120 and the thick-solid-line curve 122.

The thick-broken-line curve 120 shown in FIG. 10 does not correspond to the measured data acquired in step S21, but rather, represents the driving force prior to switching from the MOT mode to the ENG mode. However, the threshold value for the pedal opening θ, which corresponds to the measured data acquired in step S21, may be used instead of the threshold value TH1.

If the remaining electric power level of the battery 22 is low, the vehicle 10 is driven in the ENG mode, not the MOT mode. Furthermore, if the remaining electric power level of the battery 22 is low, the second acceleration assistance threshold value TH3 is used. Consequently, if the remaining electric power level of the battery 22 is low, the thick-solid-line curve 122 is used, even if the vehicle speed V is relatively low, i.e., within a domain in which the vehicle speed V is less than the switching point 126.

Rather than being performed by the developer of the vehicle 10, the process of step S23 may be carried out by an electronic control unit such as the reaction force ECU 48 or the like.

(2-2-4-2-4. Setting of Acceleration Assistance Opening θAcc in View of First Additive Value Q1)

In step S24 of FIG. 9, the developer of the vehicle 10 sets the sum of the cruise opening θcru and the first additive value q1 (hereinafter referred to as an "acceleration assistance opening θacc") on the basis of the target driving force Ftar for each of the respective vehicle speeds V.

Figure 11:
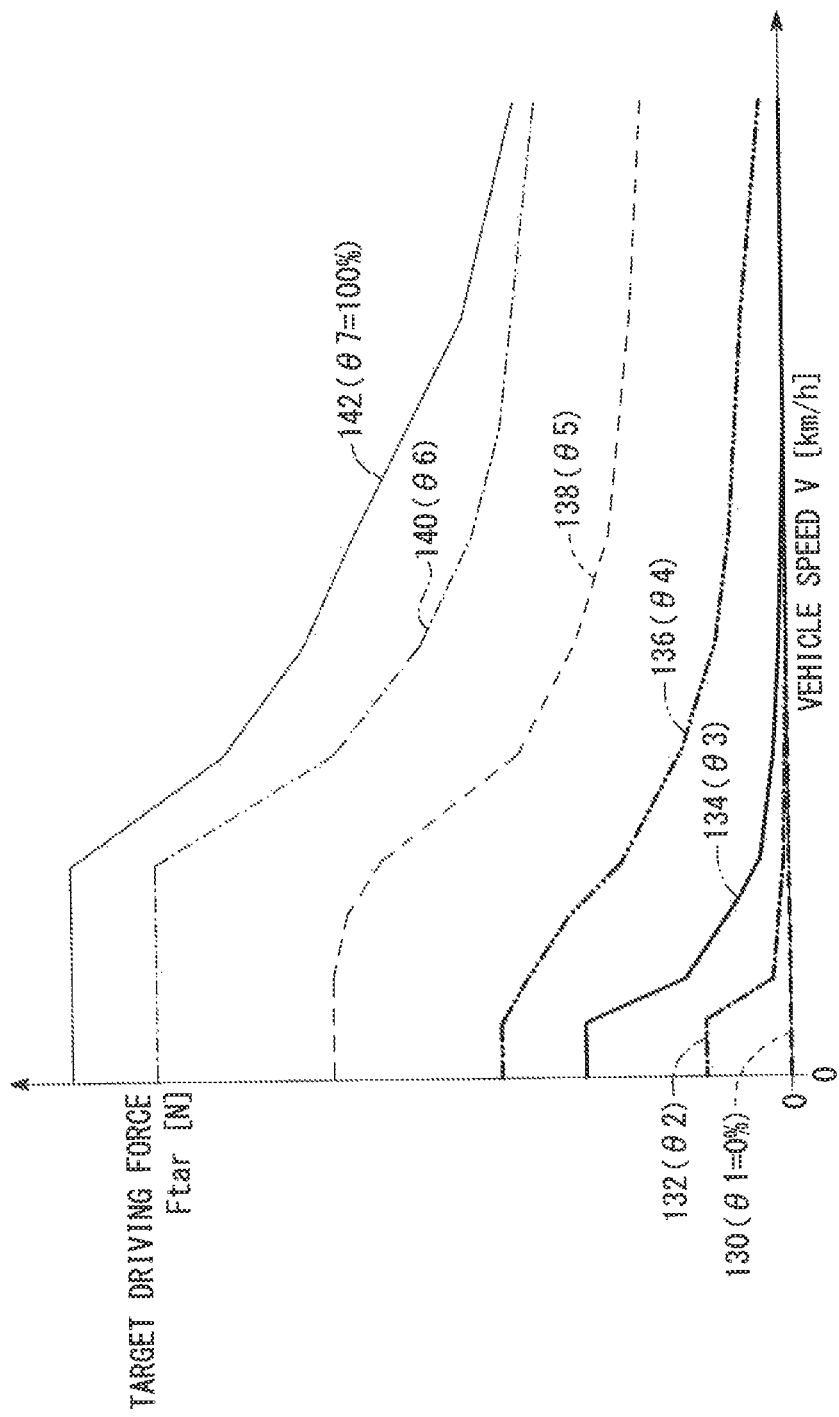
FIG. 11 is a diagram showing a map, which is used when an acceleration assistance opening is set on the basis of the target driving force.

FIG. 11 is a diagram showing a map that is used when an acceleration assistance opening θacc is set on the basis of the target driving force Ftar. It should be noted that in FIG. 11, the energy efficiency of the engine 14, or stated otherwise, the second additive value q2, is not taken into account. FIG. 11 shows a relationship between the vehicle speed V, the target driving force Ftar, and the pedal opening θ. More specifically, the map shown in FIG. 11 includes characteristic curves, which represent the vehicle speed V and the target driving force Ftar for each of respective values of the pedal opening θ.

For example, when the pedal opening θ is one of the values θ1, θ2, θ3, θ4, θ5, θ6, and θ7, the relationship between the vehicle speed V and the target driving force Ftar is indicated respectively by characteristic curves 130, 132, 134, 136, 138, 140, and 142. Further, in the map, θ1<θ2–θ3<θ4<θ5<θ6<θ7, where θ1=0 [%] and θ=100[%].

The developer of the vehicle 10 acquires beforehand measured data or simulated data of the relationship shown in FIG.

11, and stores the acquired data. From the target driving force Ftar determined in step S23 (FIG. 9) and the characteristic curves shown in FIG. 11, the developer of the vehicle 10 sets an acceleration assistance opening θacc for each of the respective vehicle speeds V. In other words, a pedal opening θ, which corresponds to the target driving force Ftar for each respective vehicle speed V, is set as an acceleration assistance opening θacc (=cruise opening θcru+first additive value q1).

As shown in FIG. 8, the lower the vehicle speed V is, the greater the first additive value q1 becomes. Further, the higher the vehicle speed V is, the smaller the first additive value q1 becomes. Thus, the first additive value q1 is set in view of the requested longitudinal G that was set in step S22, i.e., in view of the fact that the lower the vehicle speed V is, the greater the requested longitudinal G becomes, and the higher the vehicle speed V is, the smaller the requested longitudinal G becomes. However, as described above, since the requested longitudinal G is constant when the vehicle speed V is equal to or less than V1, the first additive value q1 also is constant when the vehicle speed V is equal to or less than V1.

Rather than being performed by the developer of the vehicle 10, the process of step S24 may be carried out by an electronic control unit such as the reaction force ECU 48 or the like.

(2-2-4-2-5. Setting of Threshold Values TH2, TH3 in View of Second Additive Value Q2)

In step S25 of FIG. 9, the developer of the vehicle 10 sets threshold values TH2, TH3 in view of energy efficiency (the second additive value q2) of the engine 14.

The threshold values TH2, TH3 may be established as pedal openings θ at the best fuel consumption point, or as pedal openings θ that lie within a best fuel consumption region obtained on the basis of a net fuel consumption ratio (BSFC: Brake Specific Fuel Consumption), from the relationship between the pedal opening θ and the vehicle speed V (or the engine rotational speed NE).

Alternatively, as described later, the threshold values TH2, TH3 may be set as values within a region (hereinafter referred to as a "high-efficiency electric generating region" or a "charging-promotion region") in which the value of energy·torque obtained per unit amount (e.g., 1 cc) of fuel is maximum. As a result, the amount of electric power generated by the alternator 18 in the case that the engine 14 is driven per unit amount of fuel becomes relatively high.

Figure 12:
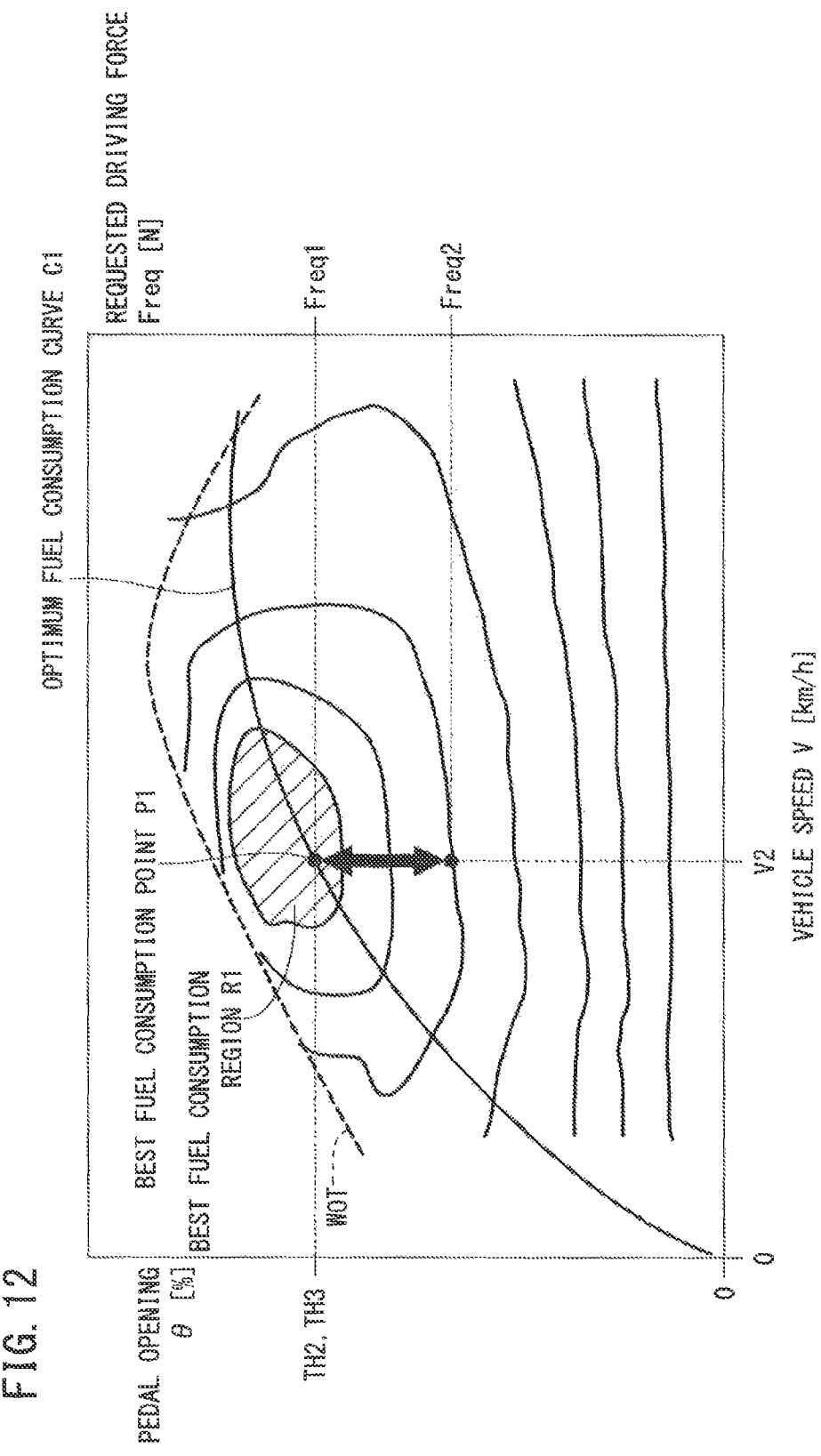
FIG. 12 is a diagram illustrating a process of setting the first and second acceleration assistance threshold values.

FIG. 12 is a diagram illustrating a process of setting the first and second acceleration assistance threshold values TH2, TH3. As shown in FIG. 12, the threshold values TH2, TH3 may be established as pedal openings θ at a best fuel consumption point, or as pedal openings θ that lie within a best fuel consumption region obtained on the basis of the net fuel consumption ratio (BSFC), from the relationship between the pedal opening θ (requested driving force Freq) and the vehicle speed V.

In FIG. 12, if the vehicle speed V is V2 and the best fuel consumption point (at the center of a best fuel consumption region R1) obtained on the basis of BSFC is Freq1, the threshold values TH2, TH3 may be established to correspond with the best fuel consumption point Freq1. Other values that lie within the best fuel consumption region R1 may be established for the threshold values TH2, TH3. If the pedal opening θ is used as the threshold value TH2 or TH3 in FIG. 12, the requested driving force Freq is indicated by Freq1, and a driving force that contributes to traveling of the vehicle 10, i.e., a driving force corresponding to the acceleration assistance opening θacc (=θcru+q1), is indicated by Freq2. A driving force that corresponds to the difference between Freq1 and Freq2 (Freq1−Freq2) can be made available for purposes apart from driving the vehicle 10, e.g., for actuating the traction motor 16 in order to generate electric power, or for actuating the alternator 18 or various accessories or auxiliaries, not shown.

The best fuel consumption region R1 and the best fuel consumption point P1, which are obtained on the basis of the BSFC, change depending on the vehicle speed V and the requested driving force Freq (≅the torque of the engine 14) and are represented by an optimum fuel consumption curve C1 in FIG. 12. Further, the curve denoted by "WOT" represents a relationship between the vehicle speed V and the requested driving force Freq when the vehicle 10 is driven in a WOT (Wide Open Throttle) state. When the best fuel consumption region R1 or the best fuel consumption point P1, which is obtained on the basis of the BSFC, is used, it is possible to promote charging of the battery 22 in a state in which the efficiency of the engine 14 is high.

The vehicle speed V in FIG. 12 may be replaced with the engine rotational speed NE, for example. Further, the requested driving force Freq in FIG. 12 may be replaced with the torque of the engine 14, for example. Moreover, the relationship between the pedal opening θ and the vehicle speed V, or the relationship between the pedal opening θ and the engine rotational speed NE, may be changed depending on the transmission ratio (gear position).

With the threshold values TH2, TH3 set in the foregoing manner, and the pedal opening θ being equal to the threshold values TH2, TH3, the driving state ECU 32 controls the output of the engine 14 to achieve a value corresponding to the threshold values TH2, TH3. In addition, the driving state ECU 32 controls the driving force F of the vehicle 10 so as to have a value that corresponds to the acceleration assistance opening θacc (=θcru+q1). Further, the driving state ECU 32 controls the amount of electric energy generated by the alternator 18, or the amount of electric energy regenerated by the motor 16, so as to have a value that corresponds to the second additive value q2.

3. Advantages of the Present Embodiment

According to the present embodiment, as described above, values produced by adding the predetermined quantities Q1, Q2 (first additive value q1) to the cruise opening θcru are set as the first and second acceleration assistance threshold values TH2, TH3 (reaction force increasing openings). If the driver depresses the accelerator pedal 34 to the threshold values TH2, TH3, it is possible to achieve a longitudinal G that depends on the vehicle speed V at the present time. Accordingly, it is possible to prevent the driver from feeling uneasy and uncomfortable concerning the action to accelerate the vehicle 10. In addition, the ease with which the accelerator pedal 34 (vehicle 10) is operated can be enhanced.

According to the present embodiment, the reaction force ECU 48 (reaction force control unit) sets the threshold values TH2, TH3 in order to reduce the predetermined quantities Q1, Q2 (first additive value q1) as the vehicle speed V increases (FIG. 8). Therefore, by depressing the accelerator pedal 34 to the threshold values TH2, TH3 in a low vehicle speed range, it is possible for the driver to achieve a relatively large acceleration. As a result, the vehicle 10 can achieve a rate of acceleration required to catch up with traffic, for example (however, rather than the threshold value TH2, the threshold value TH1 is used in the low vehicle speed range). Further, in a high vehicle speed range, it is possible for the driver to achieve a relatively small acceleration by maintaining the accelerator pedal 34 at the threshold values TH2, TH3. As a result, it is possible to prevent the vehicle 10 from accelerating excessively, thereby preventing degradation in energy efficiency (fuel consumption or electric energy consumption).

The reaction force ECU 48 (reaction force control unit) sets the threshold values TH2, TH3 to pedal openings θ that enable the engine 14 to produce an output with better kinetic efficiency or operating efficiency (energy efficiency) (FIG. 12). In addition, the predetermined quantities Q1, Q2 (first additive value q1 and second additive value q2) are set to values for achieving a rate of acceleration depending on each vehicle speed V, and which enable the alternator 18 or the motor 16 to generate electric energy with the driving force Fe of the engine 14.

With this arrangement, by depressing the accelerator pedal 34 to the threshold values TH2, TH3, the driver is capable of accelerating the vehicle 10 so that the engine 14 produces an output with better kinetic efficiency. Consequently, it is possible to achieve a vehicle speed V depending on each of the respective vehicle speeds V, and to enable the alternator 18 or the motor 16 to generate electric energy with adequate energy efficiency. In addition, it is possible to inform the driver concerning the pedal opening θ at which better fuel consumption is achieved for each respective vehicle speed V.

According to the present embodiment, if the MOT mode (first driving mode) is capable of being selected on the basis of the vehicle speed V and the remaining electric power level of the battery 22 (the state of the vehicle 10), the reaction force ECU 48 (reaction force control unit) performs a reaction force control process using the threshold value TH1. On the other hand, if the MOT mode (first driving mode) cannot be selected, the reaction force ECU 48 (reaction force control unit) performs a reaction force control process using the threshold value TH2 or TH3 (FIGS. 2 and 3). Therefore, if the MOT mode is capable of being selected, a reaction force control process for increasing the pedal reaction force Fr is carried out upon switching from driving the vehicle 10 with only the motor 16 (electric motor) to driving the vehicle 10 with at least the engine 14, thereby making it possible to inform the driver that the vehicle 10 is being driven with better fuel consumption. When the MOT mode cannot be selected, a reaction force control process is carried out using values (i.e., threshold values TH2, TH3) produced by adding the predetermined quantities Q1, Q2 to the cruise opening θcru. Consequently, the driver can be prevented from feeling uneasy and uncomfortable in relation to the action to accelerate the vehicle 10. Therefore, both of the reaction force control processes are compatible with each other.

According to the present embodiment, the accelerator-pedal-reaction-force control apparatus 12 is equipped with the driving state ECU 32 (mode switching unit) for switching between the MOT mode (first driving mode) and the ENG mode (second driving mode). If the vehicle speed V is less than a predetermined value V1, the driving state ECU 32 selects the MOT mode or the ENG mode depending on the pedal opening θ (see FIG. 2). If the vehicle speed V is greater than the predetermined value V1, the driving state ECU 32 selects the ENG mode. If the vehicle speed V exceeds the predetermined value V1, the reaction force ECU 48 (reaction force control unit) changes from the reaction force control process using the threshold value TH1 to the reaction force control process using the threshold value TH2 (see FIG. 2).

With the above arrangement, whether or not the MOT mode is selected is determined depending on the vehicle speed V. If the vehicle speed V is less than the predetermined value V1, i.e., if the vehicle 10 is in the low vehicle speed range, the MOT mode (first driving mode) and the ENG mode (second driving mode) are switched from one to the other depending on the pedal opening θ (see FIG. 2). If the MOT mode can be selected, the threshold value TH1 (first opening threshold value) is used, whereas if the MOT mode cannot be selected, the threshold value TH2 (second opening threshold value) is used. Depending on the vehicle speed V, if a state in which the MOT mode is capable of being selected changes to a state in which the MOT mode cannot be selected, the reaction force control process using the threshold value TH1 changes to the reaction force control process using the threshold value TH2 (see FIG. 2). Consequently, it is possible for the reaction force control process to be implemented corresponding to the driving mode (driving state of the vehicle 10).

B. Modifications

The present invention is not limited to the above embodiment, but various alternative arrangements may be employed based on the disclosed content of the present specification. For example, the present invention may employ the following arrangements.

1. Objects Incorporating the Invention

In the above embodiment, the reaction force control apparatus 12 is incorporated in the vehicle 10, which includes the engine 14 and the traction motor 16 as drive sources for generating driving forces. However, the present invention is not limited to this feature, insofar as a longitudinal G (requested longitudinal G) can be achieved depending on the vehicle speed V. For example, the vehicle 10 may have only either one of the engine 14 or the motor 16. Alternatively, the arrangement shown in FIG. 1, in which the traction motor 16 is directly coupled to the engine 14 for driving the drive wheels, e.g., the front wheels, may additionally include one or two traction motors (second traction motors) for driving the other drive wheels, e.g., the rear wheels. Stated otherwise, the present invention may be applied to a four-wheel-drive hybrid vehicle. In such a four-wheel-drive hybrid vehicle, the engine 14 may be assisted in the ENG+MOT mode by the one or two second traction motors.

2. Traction Motor 16

In the above embodiment, while the engine 14 is in operation, the traction motor 16 either is not operated (ENG mode) or the traction motor 16 is operated together with the engine 14 (ENG+MOT mode). However, the traction motor 16 may be operated in a regenerative mode in order to generate electric power under a drive power from the engine 14. Stated otherwise, the traction motor 16 may carry out the function of the alternator 18. In this case, the first and second acceleration assistance threshold values TH2, TH3 may be established within a region in which the amount of electric power generated by the traction motor 16, which is actuated when the engine 14 is driven per unit amount of fuel, is equal to or greater than a predetermined amount-of-electric-power threshold value, for example. Consequently, if the driver maintains the accelerator pedal 34 at one of the threshold values TH2, TH3 or in the vicinity thereof, it is possible to relatively increase the amount of electric power generated by the traction motor 16. Therefore, charging of the battery 22 can be promoted.

As described above, if one or two second traction motors are used in addition to the engine 14 and the traction motor 16 (four-wheel-drive hybrid vehicle), the vehicle 10 may be driven by the engine 14 in addition to the one or two second traction motors in the ENG+MOT mode. At the same time, the traction motor 16 may be operated in a regenerative mode in order to generate electric power using the drive power from the engine 14, for thereby charging the battery 22.

3. Switching Between Driving Modes

[3-1. Characteristics Depending on Remaining Electric Power Level of Battery 22]

In the above embodiment, the driving modes (MOT mode, ENG mode, and ENG+MOT mode) are switched according to two characteristics, i.e., one in which the remaining electric power level of the battery 22 is high, and one in which the remaining electric power level of the battery 22 is low (FIGS. 2 and 3). However, for switching between the driving modes, three or more characteristics may be established depending on the remaining electric power level of the battery 22.

In the above embodiment, the MOT mode, the ENG mode, and the ENG+MOT mode are established as switchable modes at the time that the remaining electric power level of the battery 22 is high (FIG. 2), and the ENG mode and the ENG+MOT mode are established as switchable modes at the time that the remaining electric power level of the battery 22 is low (FIG. 3). However, the driving modes may be combined in other ways, insofar as the longitudinal G (requested longitudinal G) is achieved depending on the vehicle speed V. For example, if the remaining electric power level of the battery 22 is high, a combination of the MOT mode, the ENG mode, and the ENG+MOT mode, a combination of the ENG mode and the ENG+MOT mode, and a combination of the MOT mode and the ENG+MOT mode may be established. Further, if the remaining electric power level of the battery 22 is low, only the ENG mode or only the ENG+MOT mode may be established.

Figure 13:
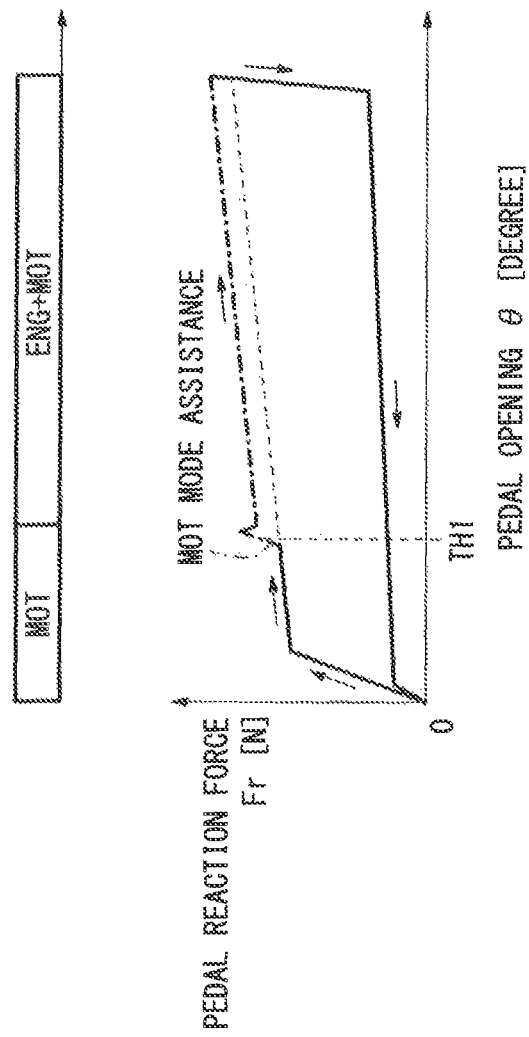
FIG. 13 is a diagram showing a modification of the relationship between the pedal opening and the pedal reaction force, if the pedal opening is increased and then reduced at a time that the remaining electric power level of the battery is high.

FIG. 13 is a diagram showing a modification of the relationship between the pedal opening θ and the pedal reaction force Fr, if the pedal opening θ is increased and then reduced at a time that the remaining electric power level of the battery 22 is high.

According to the modification shown in FIG. 13, when the pedal opening θ increases from zero, initially the MOT mode is selected. As the pedal opening θ becomes higher, the MOT mode changes to the ENG+MOT mode. Just prior to changing from the MOT mode to the ENG+MOT mode, at the MOT mode assistance threshold value TH1, the pedal reaction force Fr increases sharply, thereby allowing the driver to recognize that switching is about to take place from the MOT mode to the ENG+MOT mode. The characteristics shown in FIG. 13 can be applied if the driver depresses the accelerator pedal 34 at a high rate [°/sec] in excess of a predetermined depression rate threshold value, and if the pedal opening θ is large in excess of a predetermined opening threshold value. The modification shown in FIG. 13 makes it possible for the acceleration of the vehicle 10 to be increased sharply in situations where the vehicle 10 needs to be accelerated quickly.

[3-2. Switching Criteria]

In the above embodiment (see FIGS. 2 and 3), the driving modes (MOT mode, ENG mode, and ENG+MOT mode) are switched depending on the vehicle speed V and the pedal opening θ (requested driving force Freq). However, the driving modes may be switched depending on other switching criteria, insofar as such criteria include the pedal opening θ (requested driving force Freq). For example, the driving modes may be switched depending on only the pedal opening θ (requested driving force Freq). Alternatively, the driving modes may be switched depending on the pedal opening θ (requested driving force Freq) and the acceleration [km/h/s].

In the present embodiment (FIGS. 2 and 3), whether or not the MOT mode can be selected is determined based on whether or not the vehicle speed V is less than V1, and whether or not the remaining electric energy level of the battery 22 is high. However, the present invention is not limited to such switching criteria, insofar as the ability to select the MOT mode can be determined depending on the state of the vehicle 10 or an action taken by the driver. For example, a threshold value (warming-up threshold value) for the coolant temperature of the engine 14 may be established for assessing whether or not the engine 14 needs to be warmed up, and in this case, the MOT mode may be inhibited if the temperature of the coolant is less than the warming-up threshold value. Alternatively, the ability to select the MOT mode may be determined depending on an input action, which is entered by the driver through a non-illustrated input unit, such as a switch, a button, a microphone, or the like.

[3-3. MOT Mode Assistance Threshold Value TH1]

In the above embodiment, the MOT mode assistance threshold value TH1 is used. However, the MOT mode assistance threshold value TH1 need not necessarily be used, as long as the first and second acceleration assistance threshold values TH2, TH3 are used.

In the above embodiment, when the remaining electric power level of the battery 22 is low, a threshold value that is similar to the MOT mode assistance threshold value TH1 is not used (FIG. 3). However, it is possible to establish a threshold value that is similar to the threshold value TH1, insofar as the threshold value becomes smaller than when the remaining electric power level of the battery 22 is high, for example.

[3-4. First and Second Acceleration Assistance Threshold Values TH2, TH3]

In the above embodiment (FIGS. 2 and 3), the first and second acceleration assistance threshold values TH2, TH3, which indicate sums of the cruise opening θcru and the predetermined quantities Q1, Q2, are used as values within the high-fuel-consumption-efficiency region (high-efficiency electric generating region or charging-promotion region). However, other values may be used, insofar as such values achieve a longitudinal G (requested longitudinal G) depending on the vehicle speed V. For example, the threshold values TH2, TH3 may be established as being indicated by only the first additive value q1 and exclusive of the second additive value q2.

In the above embodiment (FIGS. 2 and 3), both of the threshold values TH2 and TH3 are used. However, only one of the threshold values TH2 or TH3 may be used.

In the above embodiment (FIG. 8), the first additive value q1 is established within the full range of vehicle speeds V. However, the present invention is not limited to establishing the first additive value q1 in this manner, insofar as a longitudinal G (requested longitudinal G) is achieved depending on the vehicle speed V. For example, within a region in which the vehicle speed V is equal to or greater than a predetermined value (e.g., 80 km/h), the threshold values TH2, TH3 may be established without using the first additive value q1. The same holds true for the second additive value q2. Accordingly, if the vehicle speed V is equal to or greater than the predetermined value, the cruise opening θcru may be established as the threshold values TH2, TH3.

In the above embodiment, the threshold values TH2, TH3 are established for the pedal opening θ at the best fuel consumption point, or within a best fuel consumption region obtained on the basis of the net fuel consumption ratio (BSFC) from the relationship between the pedal opening θ (requested driving force Freq) and the vehicle speed V (FIG. 12). However, the threshold values TH2, TH3 may be set in other ways. For example, the threshold values TH2, TH3 may be set to values in a region (high-efficiency electric generating region or charging-promotion region) at which the value of energy·torque obtained per unit amount (e.g., 1 cc) of fuel is maximum.

The invention claimed is:

1. An accelerator-pedal-reaction-force control apparatus having a reaction force control unit configured to control a reaction force applied to an accelerator pedal of a vehicle, wherein:
   an opening of the accelerator pedal configured to increase the reaction force applied to the accelerator pedal so as to be greater than a base reaction force is defined as a reaction force increasing opening, an opening of the accelerator pedal configured to allow the vehicle to continue cruising at a present vehicle speed is defined as a cruise opening, and the reaction force control unit sets a value, which is produced by adding a predetermined quantity to the cruise opening, as the reaction force increasing opening;
   the predetermined quantity is established as a value for achieving a longitudinal acceleration depending on each of respective vehicle speeds, and
   the predetermined quantity is established so as to achieve a relatively large longitudinal acceleration of the vehicle in a low vehicle speed range and a relatively small longitudinal acceleration of the vehicle in a high vehicle speed range.

2. The accelerator-pedal-reaction-force control apparatus according to claim 1, wherein the reaction force control unit sets the reaction force increasing opening such that the higher the vehicle speed is, the smaller the predetermined quantity becomes.

3. The accelerator-pedal-reaction-force control apparatus according to claim 1, wherein:
   the reaction force control unit sets the reaction force increasing opening to an opening of the accelerator pedal, which enables an engine that is mounted on the vehicle to produce an output with better kinetic efficiency than a threshold kinetic efficiency; and
   the predetermined quantity is established as a value for achieving an acceleration depending on each of the respective vehicle speeds, and for enabling an electric generator that is mounted on the vehicle to generate electric power under a drive power from the engine.

4. The accelerator-pedal-reaction-force control apparatus according to claim 1, wherein:
   an opening of the accelerator pedal, at which a first driving mode for driving the vehicle by energizing only a motor which is mounted on the vehicle and is used as a drive source of the vehicle switches to a second driving mode for driving the vehicle with at least an engine, is defined as a first opening threshold value, and the value, which is produced by adding the predetermined quantity to the cruise opening, is defined as a second opening threshold value;
   if the first driving mode can be selected depending on a state of the vehicle or an action taken by a driver of the vehicle, the reaction force control unit carries out a reaction force control process using the first opening threshold as the reaction force increasing opening; and
   if the first driving mode cannot be selected, the reaction force control unit carries out a reaction force control process using the second opening threshold as the reaction force increasing opening.

5. The accelerator-pedal-reaction-force control apparatus according to claim 4, further including a mode switching unit configured to switch between the first driving mode and the second driving mode, wherein:
   the mode switching unit selects the first driving mode and the second driving mode depending on the opening of the accelerator pedal if the vehicle speed is less than a predetermined value, and selects the second driving mode if the vehicle speed is greater than the predetermined value; and
   if the vehicle speed exceeds the predetermined value, the reaction force control unit changes from the reaction force control process using the first opening threshold to the reaction force control process using the second opening threshold.

6. A vehicle including an accelerator-pedal-reaction-force control apparatus, the accelerator-pedal-reaction-force control apparatus having a reaction force control unit configured to control a reaction force applied to an accelerator pedal of the vehicle, wherein:
   an opening of the accelerator pedal configured to increase the reaction force applied to the accelerator pedal so as to be greater than a base reaction force is defined as a reaction force increasing opening, an opening of the accelerator pedal configured to allow the vehicle to continue cruising at a present vehicle speed is defined as a cruise opening, and the reaction force control unit sets a value, which is produced by adding a predetermined quantity to the cruise opening, as the reaction force increasing opening; and
   the predetermined quantity is established as a value for achieving a longitudinal acceleration depending on each of respective vehicle speeds and the predetermined quantity is established so as to achieve a relatively large longitudinal acceleration of the vehicle in a low vehicle speed range and a relatively small longitudinal acceleration of the vehicle in a high vehicle speed range.

* * * * *